US012795471B2

(12) United States Patent
Wu et al.

(10) Patent No.: US 12,795,471 B2
(45) Date of Patent: Nov. 10, 2026

(54) MANAGING MULTI-CONNECTIVITY COORDINATION INFORMATION FOR CONDITIONAL SECONDARY NODE PROCEDURES

(71) Applicant: GOOGLE LLC, Mountain View, CA (US)

(72) Inventors: Chih-Hsiang Wu, Taoyuan City (TW); CHing-Jung Hsieh, Taoyuan City (TW)

(73) Assignee: GOOGLE LLC, Mountain View, CA (US)

( * ) Notice: Subject to any disclaimer, the term of this patent is extended or adjusted under 35 U.S.C. 154(b) by 293 days.

(21) Appl. No.: 18/681,505

(22) PCT Filed: Aug. 4, 2022

(86) PCT No.: PCT/US2022/039406

§ 371 (c)(1),
(2) Date: Feb. 5, 2024

(87) PCT Pub. No.: WO2023/014873

PCT Pub. Date: Feb. 9, 2023

(65) Prior Publication Data

US 2025/0133452 A1 Apr. 24, 2025

Related U.S. Application Data

(60) Provisional application No. 63/229,883, filed on Aug. 5, 2021.

(51) Int. Cl.

| | |
|---|---|
| ***H04W 36/00*** | (2009.01) |
| ***H04W 76/15*** | (2018.01) |
| ***H04W 76/28*** | (2018.01) |

(52) U.S. Cl.

CPC . *H04W 36/00698* (2023.05); *H04W 36/0069* (2018.08); *H04W 76/15* (2018.02); *H04W 76/28* (2018.02)

(58) Field of Classification Search

CPC ....... H04W 36/0069; H04W 36/00698; H04W 36/362; H04W 36/0072; H04W 76/15; H04W 76/28

(Continued)

(56) References Cited

U.S. PATENT DOCUMENTS

2015/0215912 A1* 7/2015 Jha ........................ H04W 76/28 370/311

2018/0184475 A1 6/2018 Babaei et al.

(Continued)

FOREIGN PATENT DOCUMENTS

CN 111314974 A 6/2020

CN 111901839 A 11/2020

(Continued)

OTHER PUBLICATIONS

3GPP TS 38.423 v16.0.0; "3rd Generation Partnership Project; Technical Specification Group Radio Access Network; NG-RAN; Xn application protocol (XnAP) (Release 16)"; Jul. 2021. (Year: 2021).*

(Continued)

*Primary Examiner* — Stephen J Clawson

(74) *Attorney, Agent, or Firm* — MARSHALL, GERSTEIN & BORUN LLP

(57) ABSTRACT

Base stations perform methods for supporting a conditional procedure for a user equipment (UE). A method performed by a first base station may include receiving (1202), by the first base station from a second base station, an indication of one or more candidate secondary cells to which the UE can connect, subject to a condition, to communicate in dual connectivity (DC); receiving (1204), by the first base station, subsequently to the UE connecting to a secondary cell among the one or more candidate secondary cells for which the condition is satisfied, coordination information for the (Continued)

secondary cell, the coordinating information being usable for coordinating usage of radio resources with the second base station while the UE communicates in DC; and applying (1206), by the first base station, the coordination information to coordinate the usage of radio resources with the second base station.

20 Claims, 18 Drawing Sheets

(58) Field of Classification Search
USPC .......................................................... 370/331
See application file for complete search history.

(56) References Cited

U.S. PATENT DOCUMENTS

| | | | | |
|---|---|---|---|---|
| 2019/0281650 | A1* | 9/2019 | Wu | H04W 36/0033 |
| 2020/0396661 | A1 | 12/2020 | Wu | |
| 2021/0105681 | A1* | 4/2021 | Paladugu | H04W 36/00837 |
| 2021/0153076 | A1* | 5/2021 | Wang | H04L 61/00 |
| 2021/0211899 | A1* | 7/2021 | Koziol | H04W 24/10 |
| 2021/0298120 | A1* | 9/2021 | Sharma | H04W 76/27 |
| 2022/0116803 | A1* | 4/2022 | Yan | H04W 36/0069 |
| 2022/0132375 | A1* | 4/2022 | Khirallah | H04W 12/106 |
| 2022/0159566 | A1* | 5/2022 | Liu | H04W 76/28 |
| 2023/0292192 | A1* | 9/2023 | Eklöf | H04W 36/385 |
| 2024/0015624 | A1* | 1/2024 | Maemoto | H04W 36/12 |
| 2024/0098611 | A1* | 3/2024 | Da Silva | H04W 24/08 |
| 2024/0306219 | A1* | 9/2024 | Van Der Velde | H04W 76/30 |
| 2024/0406820 | A1* | 12/2024 | Stanczak | H04W 36/0085 |

FOREIGN PATENT DOCUMENTS

| | | | |
|---|---|---|---|
| WO | WO-2019/158811 | A1 | 8/2019 |
| WO | WO-2021/015659 | A1 | 1/2021 |
| WO | WO-2021/057235 | A1 | 4/2021 |
| WO | WO-2021/067830 | A1 | 4/2021 |
| WO | WO-2022/0222093 | A1 | 10/2022 |

OTHER PUBLICATIONS

"5G; NG-RAN; Architecture description (3GPP TS 38.401 version 16.2.0 Release 16)," ETSI TS 138 401 V16.2.0 (Jul. 2020).

International Search Report and Written Opinion for Application No. PCT/US2022/039406, dated Nov. 25, 2022.

NEC, "DRX Coordination in Dual Connectivity," 3GPP Draft (Mar. 22, 2014).

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)," 3GPP TS 36.300 V16.6.0 (2021).

"3rd Generation Partnership Project; Technical Specification Group Radio Access Network; Evolved Universal Terrestrial Radio Access (E-UTRA) and NR; Multi-connectivity; Stage 2 (Release 16)," 3GPP TS 37.340 V16.6.0 (2021).

"3rd Generation Partnership Project; Technical Specification Group Radio Access Network; Evolved Universal Terrestrial Radio Access (E-UTRA); Packet Data Convergence Protocol (PDCP) specification (Release 16)," 3GPP TS 36.323 V16.3.0 (2020).

"3rd Generation Partnership Project; Technical Specification Group Radio Access Network; NG-RAN; Architecture description (Release 16)," 3GPP TS 38.401 V16.6.0 (2021).

"3rd Generation Partnership Project; Technical Specification Group Radio Access Network; NG-RAN; Xn application protocol (XnAP) (Release 16)," 3GPP TS 38.423 V16.6.0 (2021).

"3rd Generation Partnership Project; Technical Specification Group Radio Access Network; NR; Packet Data Convergence Protocol (PDCP) specification (Release 16)," 3GPP TS 38.323 V16.4.0 (2021).

"3rd Generation Partnership Project; Technical Specification Group Radio Access Network; NR; Radio Resource Control (RRC) protocol specification (Release 16)," 3GPP TS 38.331 V16.5.0 (2021).

* cited by examiner

MANAGING MULTI-CONNECTIVITY COORDINATION INFORMATION FOR CONDITIONAL SECONDARY NODE PROCEDURES

FIELD OF THE DISCLOSURE

This disclosure relates generally to wireless communications and, more particularly, to managing conditional procedures for dual/multi-connectivity such as conditional secondary node addition or change procedures.

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In telecommunication systems, a user equipment (UE) sometimes can concurrently utilize resources of multiple radio access network (RAN) nodes, such as base stations or components of a distributed base station, interconnected by a backhaul. When these network nodes support different radio access technologies (RATs), this type of connectivity is referred to as Multi-Radio (MR). Concurrently using two base stations is known as dual connectivity (DC) and is standardized for LTE (i.e., "Long Term Evolution" wireless mobile network) communication systems. In 5G (standardized 5th generation wireless network) communication systems, multi-connectivity (MC) refers to the concurrent use of multiple independent communication paths, nodes, access points, or base stations for data transmission to a UE. For the sake of simplicity, in this document, the term "dual connectivity" encompasses "multi-connectivity" as well. When a UE operates in MR-DC, one base station operates as a master node (MN) that covers a primary cell (PCell), and the other base station operates as a secondary node (SN) that covers a primary secondary cell (PSCell). The UE communicates with the MN (via the PCell) and the SN (via the PSCell). In other scenarios, the UE transfers a wireless connection from one base station to another base station. For example, a serving base station can determine to hand the UE over to a target base station and initiate a handover procedure.

3GPP specification TS 37.340 v16.6.0 describes procedures for a UE to add or change an SN in DC scenarios. These procedures involve messaging (e.g., RRC signaling and preparation) between radio access network (RAN) nodes. This messaging generally causes latency, which in turn increases the probability that the SN addition or SN change procedure will fail. These legacy procedures, which do not involve conditions that are checked at the UE, can be referred to as "immediate" SN addition and SN change procedures.

More recently, for both SN or PSCell addition/change, "conditional" procedures have been considered (i.e., conditional SN or PSCell addition/change). Unlike the "immediate" procedures discussed above, these conditional procedures do not add or change the SN or PSCell, or perform the handover, until the UE determines that a condition is satisfied. As used herein, the term "condition" may refer to a single, detectable state or event (e.g., a particular signal quality metric exceeding a threshold), or to a logical combination of such states or events (e.g., "Condition A and Condition B," or "(Condition A or Condition B) and Condition C", etc.).

To configure a conditional procedure, the RAN provides the condition to the UE, along with a configuration (e.g., one or more random-access preambles, etc.) that will enable the UE to communicate with the appropriate base station, or via the appropriate cell, when the condition is satisfied. For a conditional addition of a base station as an SN or a candidate cell as a PSCell, for example, the RAN provides the UE with a condition to be satisfied before the UE can add that base station as the SN or that candidate cell as the PSCell, and a configuration that enables the UE to communicate with that base station or PSCell after the condition has been satisfied.

In the immediate PSCell addition or change procedure, the RAN (i.e., MN or SN) transmits an RRC reconfiguration message including multiple configuration parameters to the UE and the UE attempts to connect to a (target) PSCell configured by the RRC reconfiguration message. After the UE successfully connects to the SN via the PSCell, the UE communicates with the SN on the PSCell by using the multiple configuration parameters and security key(s) associated to the PSCell and derived from one or more security configuration parameters in the RRC reconfiguration message. The SN also derives security key(s) which match the security key(s) derived from the UE. After the UE successfully connects to the PSCell, the RAN (e.g., the SN) communicates data with the UE by using the matching security key(s) and the multiple configuration parameters.

In some cases, a candidate SN (C-SN) can provide multiple candidate configurations when, for example, multiple candidate PSCells are available. When the MN completes the configuration for conditional SN procedure (e.g., conditional SN addition or conditional SN cell change), the MN may not be able to determine to which among the candidate secondary cells is the UE going to connect. Moreover, because the UE connects to the secondary cell only subject to the fulfillment of one or more conditions, the MN cannot determine whether the UE will even connect to any of the candidate cells.

Conditional SN procedures present certain challenges for coordinating usage of radio resources between an MN and an SN in a correct and timely manner. Coordination can involve selecting power or discontinuous reception (DRX) parameters at the MN in view of the SN, for example, or limiting uplink power of the UE when transmitting to the MN in view of any overlapping uplink transmission to the SN.

SUMMARY

In order to overcome the above-identified problems with coordinating usage of radio resources between the MN and the SN communicating in DC with the same UE in case of a conditional procedure, the MN waits, until determining to which of multiple candidate cells the UE connects, before applying multi-connectivity coordination information for dual/multi-connectivity support. This multi-connectivity coordination information may include coordination information conveying parameters enabling the MN and SN to coordinate frequency bands, transmission timing, power control, signal directionality, and other wireless communication aspects. The multi-connectivity coordination information may additionally or alternatively include restriction information to, for example, limit maximum power levels for uplink power control at a connected RAN node. The MN may delay applying the coordination and/or restriction information received during SN configuration procedures, until after receiving a notification of the newly-connected secondary cell from the SN or from the UE. In one embodiment, the MN determines that the multi-connectivity coordination information has the same values for all candidate cells, and thus can apply the (common) multi-connectivity coordination information upon completing the SN configuration procedure.

One example embodiment is a method in a first base station for supporting a conditional procedure for a UE operating in a primary cell of the first base station. The method includes: receiving, by the first base station from a second base station, an indication of one or more candidate secondary cells to which the UE can connect, subject to a condition, to communicate in dual connectivity (DC); receiving, by the first base station, subsequently to the UE connecting to a secondary cell among the one or more candidate secondary cells for which the condition is satisfied, coordination information for the secondary cell, the coordinating information being usable for coordinating usage of radio resources with the second base station while the UE communicates in DC; and applying, by the first base station, the coordination information to coordinate the usage of radio resources with the second base station.

Another example embodiment is a method in a second base station for supporting a conditional procedure for a UE operating in a primary cell of a first base station. The method includes: transmitting, by the second base station to the first base station, an indication of one or more candidate secondary cells to which the UE can connect, subject to a condition, to communicate in dual connectivity (DC); establishing, by the second base station, a connection between the UE and a secondary cell selected from among the one or more candidate secondary cells; and after the establishing is successfully completed, transmitting, by the second base station to the first base station, coordination information for the secondary cell, for coordinating usage of radio resources between the first base station and the second base station while providing the UE communicates in DC.

Yet another example embodiment is a base station including processing hardware and a transceiver, configured to implement one of the methods described above.

DETAILED DESCRIPTION OF THE DRAWINGS

As discussed in detail below, a UE and/or one or more base stations manage conditional procedures, such as conditional PSCell addition or change (CPAC). Hereinafter, the acronyms CPA and CPC refer to a conditional PSCell addition procedure and a conditional PSCell change procedure, respectively.

Note that coordination information, which enables the MN and SN to coordinate frequency bands, transmission timing, power control, signal directionality, and other wireless communication aspects, and/or restriction information, which enables, for example, limiting maximum power levels for uplink power control at a connected RAN node, are included in multi-connectivity coordination information. In other words, multi-connectivity coordination information may include one or both of (i) coordination information and (ii) restriction information.

Figure 1A:
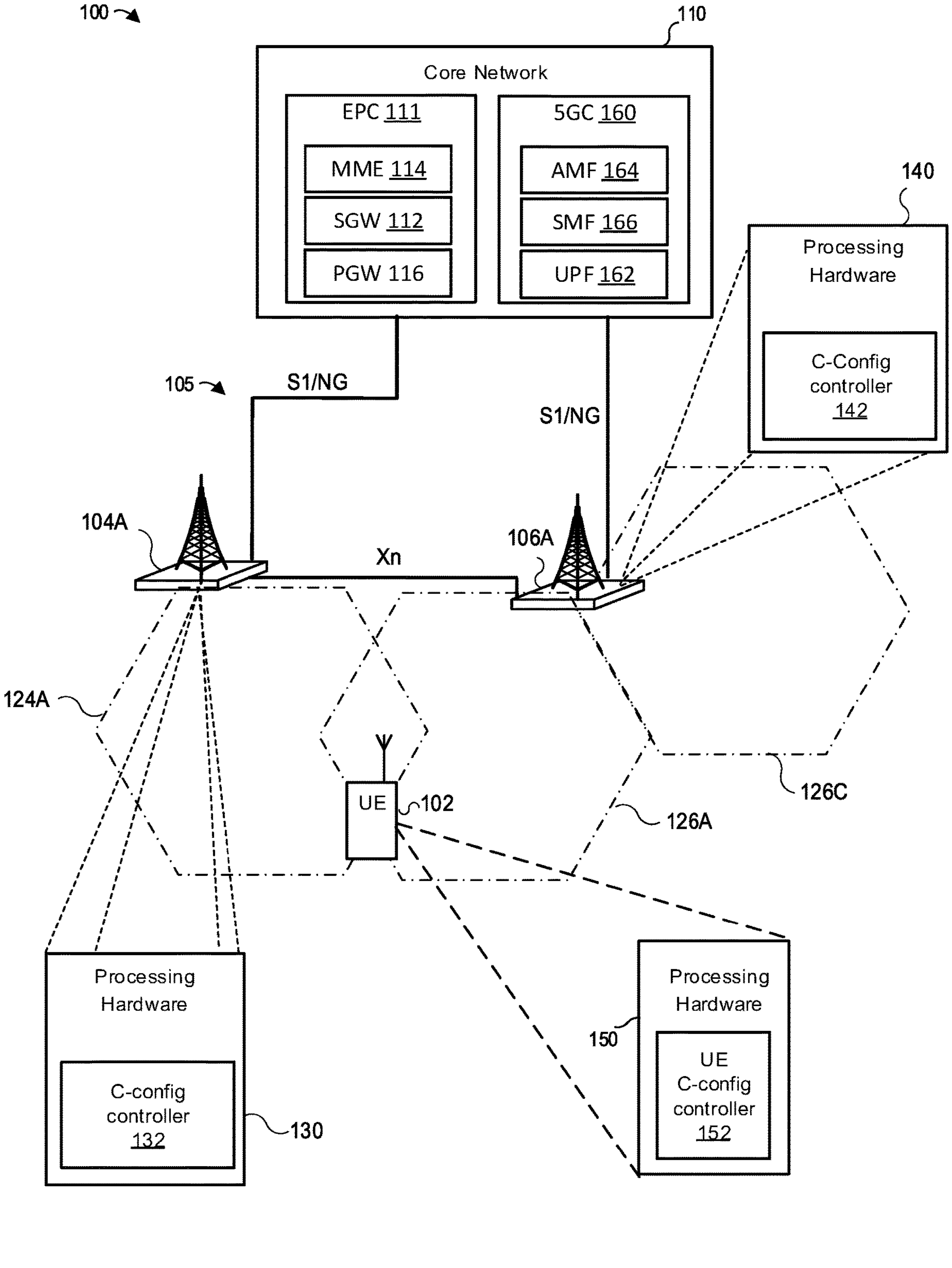
FIG. 1A is a block diagram of an example system in which a base station and/or a user equipment (UE) can manage conditional procedures related to a master node (MN) or a secondary node (SN) according to various embodiments.

Referring first to FIG. 1A, an example wireless communication system 100 includes a UE 102, a base station (BS) 104A, a base station 106A, and a core network (CN) 110. The base stations 104A and 106A can operate in a RAN 105 connected to the same core network (CN) 110. The CN 110 can be implemented as an evolved packet core (EPC) 111 or a fifth generation (5G) core (5GC) 160, for example.

Among other components, the EPC 111 can include a Serving Gateway (SGW) 112, a Mobility Management Entity (MME) 114, and a Packet Data Network Gateway (PGW) 116. The SGW 112 in general is configured to transfer user-plane packets related to audio calls, video calls, Internet traffic, etc., and the MME 114 is configured to manage authentication, registration, paging, and other related functions. The PGW 116 provides connectivity from the UE to one or more external packet data networks, e.g., an Internet network and/or an Internet Protocol (IP) Multimedia Subsystem (IMS) network. The 5GC 160 includes a User Plane Function (UPF) 162 and an Access and Mobility Management Function (AMF) 164, and/or Session Management Function (SMF) 166. Generally speaking, the UPF 162 is configured to transfer user-plane packets related to audio calls, video calls, Internet traffic, etc.; the AMF 164 is configured to manage authentication, registration, paging, and other related functions; and the SMF 166 is configured to manage PDU sessions.

As illustrated in FIG. 1A, the base station 104A supports a cell 124A, and the base station 106A supports a cell 126A. Further, each of the base stations 104A, 106A may support more than one cell. The base station 106A, for example, may also support a cell 126C. The cells 124A and 126A can partially overlap, so that the UE 102 can communicate in DC with the base station 104A and the base station 106A operating as a master node (MN) and a secondary node (SN), respectively. To directly exchange messages during DC scenarios and other scenarios discussed below, the MN 104A and the SN 106A can support an X2 or Xn interface. In general, the CN 110 can connect to any suitable number of base stations supporting NR cells and/or EUTRA cells. An example configuration in which the EPC 110 is connected to additional base stations is discussed below with reference to FIG. 1B.

The base station 104A is equipped with processing hardware 130 that can include one or more general-purpose processors such as CPUs and non-transitory computer-readable memory storing machine-readable instructions executable on the one or more general-purpose processors, and/or special-purpose processing units. The processing hardware 130 in an example implementation includes a conditional configuration controller 132 configured to manage conditional configuration for one or more conditional procedures such as Conditional Handover (CHO), Conditional PSCell Addition or Change (CPAC), or Conditional SN Additional or Change (CSAC), when the base station 104A operates as an MN.

The base station 106A is equipped with processing hardware 140 that can also include one or more general-purpose processors such as CPUs and non-transitory computer-readable memory storing machine-readable instructions executable on the one or more general-purpose processors, and/or special-purpose processing units. The processing hardware 140 in an example implementation includes a conditional configuration controller 142 configured to manage conditional configurations for one or more conditional procedures such as CHO, CPAC, or CSAC, when the base station 106A operates as an SN. The base station 106A also includes hardware for wirelessly communicating with other devices, including the UE 102, such as an antenna, transceiver, emitter, and/or receiver.

Still referring to FIG. 1A, the UE 102 is equipped with processing hardware 150 that can include one or more general-purpose processors such as CPUs and non-transitory computer-readable memory storing machine-readable instructions executable on the one or more general-purpose processors, and/or special-purpose processing units. The processing hardware 150 in an example implementation includes a UE conditional configuration controller 152 configured to manage conditional configuration for one or conditional procedures. The UE 102 also includes hardware for wirelessly communicating with other devices, including the RAN 105, such as an antenna, transceiver, emitter, and/or receiver.

The conditional configuration controllers 132, 142, and 152 may perform at least some of the methods discussed below with reference to the messaging and flow diagrams. Although FIG. 1A illustrates the conditional configuration controllers 132 and 142 as separate components, in at least some of the scenarios the base stations 104A and 106A can have similar implementations and in different scenarios operate as MN or SN nodes. In these implementations, each of the base stations 104A and 106A can implement both the conditional configuration controller 132 and the conditional configuration controller 142 to support MN and SN functionality, respectively.

In operation, the UE 102 can use a radio bearer (e.g., a DRB or an SRB) that at different times terminates at the MN 104A or the SN 106A. The UE 102 can apply one or more security keys when communicating on the radio bearer, in the uplink (from the UE 102 to a BS) and/or downlink (from a base station to the UE 102) direction. The UE in some cases can use different RATs to communicate with the base stations 104A and 106A. Although the examples below may refer specifically to specific RAT types, 5G NR or EUTRA, in general the techniques of this disclosure also can apply to other suitable radio access and/or core network technologies.

Figure 1B:
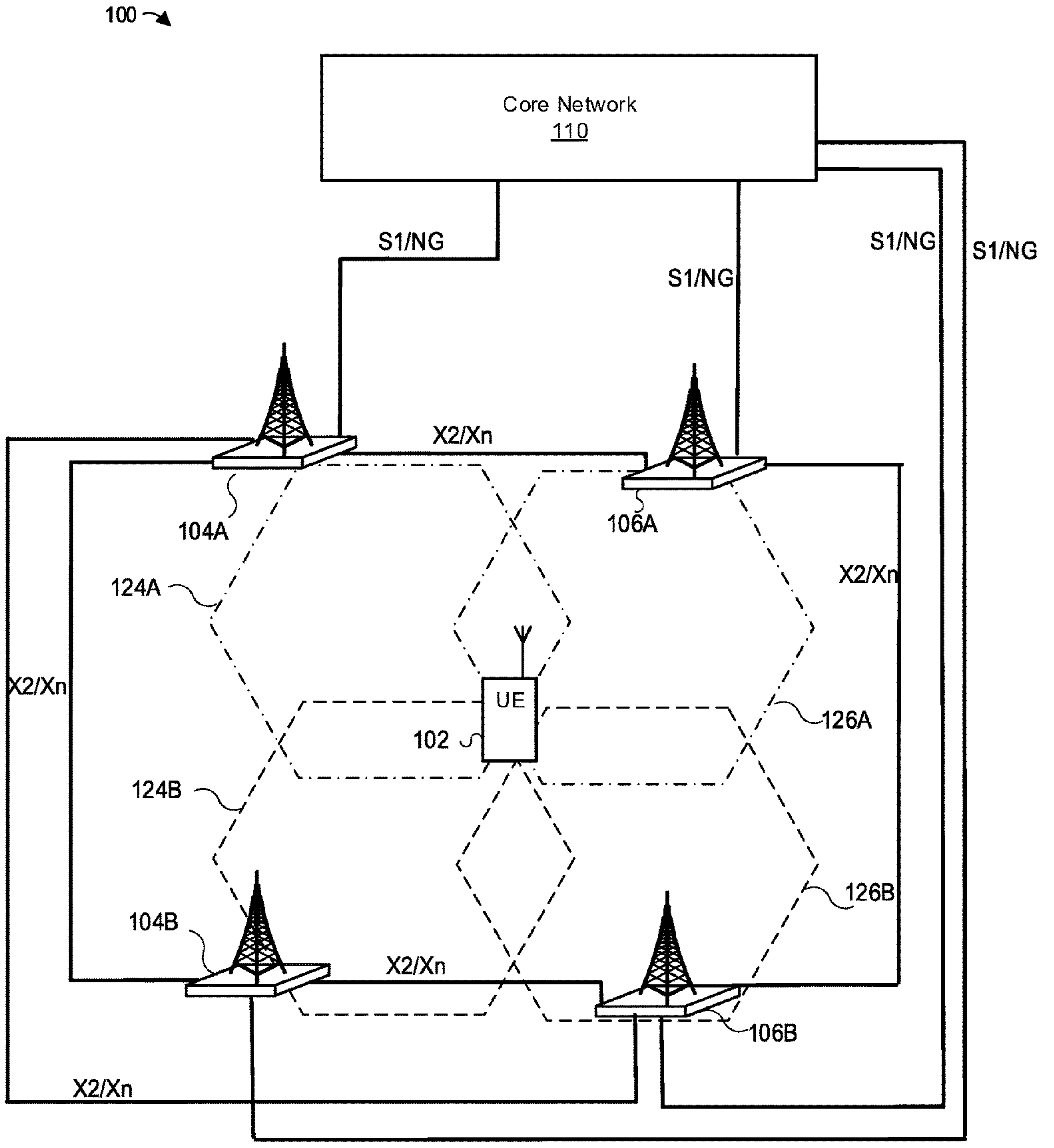
FIG. 1B is another block diagram of an example system in which a radio access network (RAN) and a user device can manage conditional procedures related to an MN or an SN according to various embodiments.

FIG. 1B depicts additional base stations 104B and 106B, which may be included in the wireless communication system 100. The UE 102 initially connects to the base station 104A. The BSs 104B and 106B may have similar processing hardware as the base station 106A.

In some scenarios, the base station 104A can perform immediate SN addition to configure the UE 102 to operate in dual connectivity (DC) with the base station 104A (via a PCell) and the base station 106A (via a PSCell other than cell 126A). The base stations 104A and 106A operate as an MN and an SN for the UE 102, respectively. The UE 102 in some cases can operate using the MR-DC connectivity mode, e.g., communicate with the base station 104A using 5G NR and communicate with the base station 106A using EUTRA, or communicate with the base station 104A using EUTRA and communicate with the base station 106A using 5G NR. Multi-connectivity coordination can help the two base stations coordinate shared UE capabilities including operational frequencies (e.g., band combinations, frequency ranges), UE measurements and reporting (e.g., intra-frequency measurements, inter-frequency measurements, inter-RAT measurements, measurement gaps), reception timing (e.g., DRX configurations, offset timing), and uplink power control (e.g., power headroom, maximum transmit power).

In one scenario, the MN 104A can perform an immediate SN change to change the SN of the UE 102 from the base station 106A (source SN, or "S-SN") to the base station 104B (target SN, or "T-SN") while the UE 102 is communicating in DC with the MN 104A and the S-SN 106A. In another scenario, the SN 106A can perform an immediate PSCell change to change the PSCell of the UE 102 to the cell 126A. In one implementation, the SN 106A can transmit a configuration changing the PSCell to cell 126A to the UE 102 via a signaling radio bearer (SRB) (e.g., SRB3) for the immediate PSCell change. In yet another scenario, the SN 106A can transmit a configuration changing the PSCell to the cell 126A to the UE 102 via the MN 104A for the immediate PSCell change. The MN 104A may transmit the configuration immediately changing the PSCell to the cell 126A to the UE 102 via SRB1. Extending multi-connectivity coordination can help the newly-added base station to coordinate shared UE capabilities with other one or more base stations connected to the UE.

In other scenarios, the base station 104A can perform a conditional SN Addition procedure to first configure the base station 106B as a C-SN for the UE 102, i.e., conditional SN addition or change (CSAC). At this time, the UE 102 can be in single connectivity (SC) with the base station 104A or in DC with the base station 104A and the base station 106A. If the UE 102 is in DC with the base station 104A and the base station 106A, the MN 104A determines whether the condition associated with the conditional SN Addition procedure is satisfied, in response to a request received from the base station 106A or in response to one or more measurement results received from the UE 102 or obtained by the MN 104A from measurements on signals received from the UE 102. In contrast to the immediate SN Addition case discussed above, the UE 102 does not immediately attempt to connect to the C-SN 106B. In this scenario, the base station 104A again operates as an MN, but the base station 106B initially operates as a C-SN rather than an SN.

More particularly, when the UE 102 receives a configuration for the C-SN 106B, the UE 102 does not connect to the C-SN 106B until the UE 102 has determined that a certain condition is satisfied (the UE 102 in some cases can consider multiple conditions, but for convenience only the discussion below refers to a single condition). Before the condition is satisfied, multi-connectivity coordination is not necessary; however, it will be helpful as soon as a C-SN becomes connected to the UE 102. When the UE 102 determines that the condition has been satisfied, the UE 102 connects to the C-SN 106B, so that the C-SN 106B begins to operate as the SN 106B for the UE 102. Thus, while the base station 106B operates as a C-SN rather than an SN, the base station 106B is not yet connected to the UE 102, and accordingly is not yet servicing the UE 102. In some embodiments, the UE 102 disconnects from the SN 106A to connect to the C-SN 106B.

In yet other scenarios, the UE 102 is in DC with the MN 104A (via a PCell) and SN 106A (via a PSCell other than cell 126A and not shown in FIG. 1A). The SN 106A can perform conditional PSCell addition or change (CPAC) to configure a candidate PSCell (C-PSCell) 126A for the UE 102. If the UE 102 is configured a signaling radio bearer (SRB) (e.g., SRB3) to exchange RRC messages with the SN 106A, the SN 106A may transmit a configuration for the C-PSCell 126A to the UE 102 via the SRB, e.g., in response to one or more measurement results which may be received from the UE 102 via the SRB or via the MN 104A or may be obtained by the SN 106A from measurements on signals received from the UE 102. In some embodiments, the SN 106A transmits the configuration for the C-PSCell 126A via the MN 104A. In contrast to the immediate PSCell change case discussed above, the UE 102 does not immediately disconnect from the PSCell and attempt to connect to the C-PSCell 126A.

More particularly, when the UE 102 receives a configuration for the C-PSCell 126A, the UE 102 does not connect to the C-PSCell 126A until the UE 102 has determined that a certain condition is satisfied (the UE 102 in some cases can consider multiple conditions, but for convenience only the discussion below refers to a single condition). When the UE 102 determines that the condition has been satisfied, the UE 102 connects to the C-PSCell 126A, so that the C-PSCell 126A begins to operate as the PSCell 126A for the UE 102. Thus, while the cell 126A operates as a C-PSCell rather than a PSCell, the SN 106A may not yet connect to the UE 102 via the cell 126A. In some implementations, the UE 102 may disconnect from the PSCell to connect to the C-PSCell 126A.

In some scenarios, the condition associated with CSAC or CPAC is signal strength/quality, which the UE 102 detects on the C-PSCell 126A of the SN 106A or on a C-PSCell 126B of C-SN 106B. The condition is satisfied if the signal strength/quality exceeds a certain threshold or otherwise corresponds to an acceptable measurement. For example, when the one or more measurement results the UE 102 obtains on the C-PSCell 126A are above a threshold configured by the MN 104A or the SN 106A or above a pre-determined or pre-configured threshold, the UE 102 determines that the condition is satisfied. When the UE 102 determines that the signal strength/quality on the C-PSCell 126A of the SN 106A is sufficiently good (again, measured relative to one or more quantitative thresholds or other quantitative metrics), the UE 102 can perform a random access procedure on the C-PSCell 126A with the SN 106A to connect to the SN 106A. After the UE 102 successfully completes the random access procedure on the C-PSCell 126A, the C-PSCell 126A becomes a PSCell 126A for the UE 102. The SN 106A then can start communicating data (user-plane data or control-plane data) with the UE 102 through the PSCell 126A. In another example, when the one or more measurement results the UE 102 obtains on the C-PSCell 126B are above a threshold configured by the MN

104A or the C-SN 106B or above a pre-determined or pre-configured threshold, the UE 102 determines that the condition is satisfied. When the UE 102 determines that the signal strength/quality on the C-PSCell 126B of the C-SN 106B is sufficiently good (again, measured relative to one or more quantitative thresholds or other quantitative metrics), the UE 102 can perform a random access procedure on the C-PSCell 126B with the C-SN 106B to connect to the C-SN 106B. After the UE 102 successfully completes the random access procedure on the C-PSCell 126B, the C-PSCell 126B becomes a PSCell 126B for the UE 102 and the C-SN 106B becomes an SN 106B. The SN 106B then can start communicating data (user-plane data or control-plane data) with the UE 102 through the PSCell 126B.

In various configurations of the wireless communication system 100, the base station 104A can operate as a master eNB (MeNB) or a master gNB (MgNB), and the base station 106A or 106B can operate as a secondary gNB (SgNB) or a candidate SgNB (C-SgNB). The UE 102 can communicate with the base station 104A and the base station 106A or 106B (106A/B) via the same RAT such as EUTRA or NR, or different RATs. When the base station 104A is an MeNB and the base station 106A is an SgNB, the UE 102 can be in EUTRA-NR DC (EN-DC) with the MeNB and the SgNB. In this scenario, the MeNB 104A may or may not configure the base station 106B as a C-SgNB to the UE 102. In this scenario, the SgNB 106A may configure cell 126A as a C-PSCell to the UE 102. When the base station 104A is an MeNB and the base station 106A is a C-SgNB for the UE 102, the UE 102 can be in SC with the MeNB. In this scenario, the MeNB 104A may or may not configure the base station 106B as another C-SgNB to the UE 102.

In some cases, an MeNB, an SeNB or a C-SgNB is implemented as an ng-eNB rather than an eNB. When the base station 104A is a Master ng-eNB (Mng-eNB) and the base station 106A is a SgNB, the UE 102 can be in next generation (NG) EUTRA-NR DC (NGEN-DC) with the Mng-eNB and the SgNB. In this scenario, the Mng-eNB 104A may or may not configure the base station 106B as a C-SgNB to the UE 102, and the SgNB 106A may configure cell 126A as a C-PSCell to the UE 102. When the base station 104A is an Mng-NB and the base station 106A is a C-SgNB for the UE 102, the UE 102 can be in SC with the Mng-NB. In this scenario, the Mng-eNB 104A may or may not configure the base station 106B as another C-SgNB to the UE 102.

When the base station 104A is an MgNB and the base station 106A/B is an SgNB, the UE 102 may be in NR-NR DC (NR-DC) with the MgNB and the SgNB. In this scenario, the MgNB 104A may or may not configure the base station 106B as a C-SgNB to the UE 102, and the SgNB 106A may configure cell 126A as a C-PSCell to the UE 102. When the base station 104A is an MgNB and the base station 106A is a C-SgNB for the UE 102, the UE 102 may be in SC with the MgNB. In this scenario, the MgNB 104A may or may not configure the base station 106B as another C-SgNB to the UE 102.

When the base station 104A is an MgNB and the base station 106A/B is a Secondary ng-eNB (Sng-eNB), the UE 102 may be in NR-EUTRA DC (NE-DC) with the MgNB and the Sng-eNB. In this scenario, the MgNB 104A may or may not configure the base station 106B as a C-Sng-eNB to the UE 102, and the Sng-eNB 106A may configure cell 126A as a C-PSCell to the UE 102. When the base station 104A is an MgNB and the base station 106A is a candidate Sng-eNB (C-Sng-eNB) for the UE 102, the UE 102 may be in SC with the MgNB. In this scenario, the MgNB 104A may or may not configure the base station 106B as another C-Sng-eNB to the UE 102.

The base stations 104A, 106A, and 106B can connect to the same core network (CN) 110 which can be an evolved packet core (EPC) 111 or a fifth-generation core (5GC) 160. The base station 104A can be implemented as an eNB supporting an S1 interface for communicating with the EPC 111, an ng-eNB supporting an NG interface for communicating with the 5GC 160, or as a base station that supports the NR radio interface as well as an NG interface for communicating with the 5GC 160. The base station 106A can be implemented as an EN-DC gNB (en-gNB) with an S1 interface to the EPC 111, an en-gNB that does not connect to the EPC 111, a gNB that supports the NR radio interface as well as an NG interface to the 5GC 160, or a ng-eNB that supports an EUTRA radio interface as well as an NG interface to the 5GC 160. To directly exchange messages during the scenarios discussed below, the base stations 104A, 106A, and 106B can support an X2 or Xn interface.

As illustrated in FIG. 1B, the base station 104A supports a cell 124A, the base station 104B supports a cell 124B, the base station 106A supports a cell 126A, and the base station 106B supports a cell 126B. The cells 124A and 126A can partially overlap, as can the cells 124A and 124B, so that the UE 102 can communicate in DC with the base station 104A (operating as an MN) and the base station 106A (operating as an SN) and, upon completing an SN change, with the base station 104A (operating as MN) and the SN 104B. More particularly, when the UE 102 operates in DC with the base station 104A and the base station 106A, the base station 104A operates as an MeNB, an Mng-eNB, or an MgNB, and the base station 106A operates as an SgNB or an Sng-eNB. When the UE 102 is in SC with the base station 104A, the base station 104A operates as an MeNB, an Mng-eNB or an MgNB, and the base station 106B operates as a C-SgNB or a C-Sng-eNB. When the UE 102 operates in DC with the base station 104A and the base station 106A, the base station 104A operates as an MeNB, an Mng-eNB or an MgNB, the base station 106A operates as an SgNB or an Sng-eNB, and the base station 106B operates as a C-SgNB or a C-Sng-eNB.

In general, the wireless communication network 100 can include any suitable number of base stations supporting NR cells and/or EUTRA cells. More particularly, the EPC 111 or the 5GC 160 can be connected to any suitable number of base stations supporting NR cells and/or EUTRA cells. Although the examples below refer specifically to specific CN types (EPC, 5GC) and RAT types (5G NR and EUTRA), the methods described in this section can apply to other suitable radio access and/or core network technologies such as sixth generation (6G) radio access and/or 6G core network or 5G NR-6G DC.

Figure 1C:
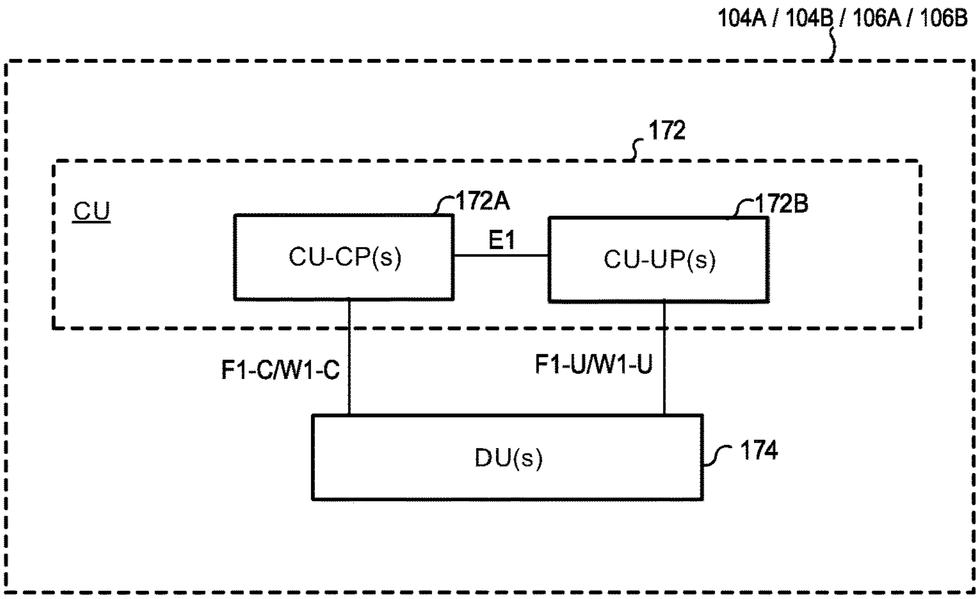
FIG. 1C is a block diagram of an example base station including a central unit (CU) and a distributed unit (DU) that can operate in the system of FIG. 1A or FIG. 1B.

FIG. 1C depicts an example of a distributed implementation of a base station such as the base station 104A, 104B, 106A, or 106B. The base station in this distributed implementation can include a central unit (CU) 172 and one or more distributed units (DUs) 174. The CU 172 is equipped with processing hardware that can include one or more general-purpose processors such as CPUs and non-transitory computer-readable memory storing machine-readable instructions executable on the one or more general-purpose processors, and/or special-purpose processing units. In one example, the CU 172 is equipped with the processing hardware 130. In another example, the CU 172 is equipped with the processing hardware 140. The processing hardware 140 in an example implementation includes an (C-)SN RRC controller configured to manage or control one or more RRC configurations and/or RRC procedures when the base station 106A operates as an SN or a candidate SN (C-SN). The base station 106B can have hardware same as or similar to the base station 106A. In some embodiments, the CU 172 can include a logical node CU-CP 172A that hosts the control plane part of the Packet Data Convergence Protocol (PDCP) protocol of the CU 172. The CU 172 can also include logical node(s) CU-UP 172B that hosts the user plane part of the PDCP protocol and/or Service Data Adaptation Protocol (SDAP) protocol of the CU 172.

The DU 174 is also equipped with processing hardware that can include one or more general-purpose processors such as CPUs and non-transitory computer-readable memory storing machine-readable instructions executable on the one or more general-purpose processors, and/or special-purpose processing units. In some examples, the processing hardware in an example implementation includes a medium access control (MAC) controller configured to manage or control one or more MAC operations or procedures (e.g., a random access procedure) and a radio link control (RLC) controller configured to manage or control one or more RLC operations or procedures when the base station 106A operates as an MN, an SN or a candidate SN (C-SN). The processing hardware may include further a physical layer controller configured to manage or control one or more physical layer operations or procedures.

Figure 2:
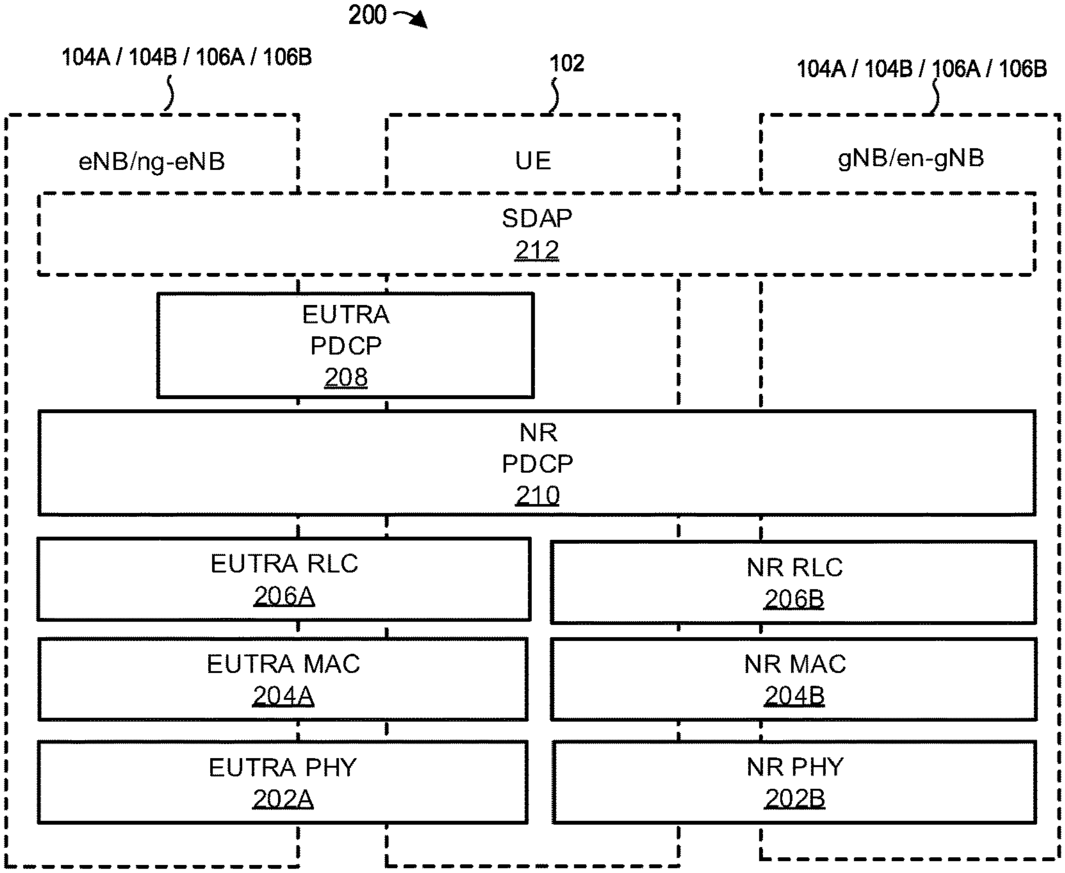
FIG. 2 is a block diagram of an example protocol stack according to which the UE of FIGS. 1A-1B can communicate with base stations.

FIG. 2 illustrates, in a simplified manner, an example protocol stack 200 according to which the UE 102 can communicate with an eNB/ng-eNB or a gNB (e.g., one or more of the base stations 104, 106).

In the example stack 200, a physical layer (PHY) 202A of EUTRA provides transport channels to the EUTRA MAC sublayer 204A, which in turn provides logical channels to the EUTRA RLC sublayer 206A. The EUTRA RLC sublayer 206A in turn provides RLC channels to a EUTRA PDCP sublayer 208 and, in some cases, to an NR PDCP sublayer 210. Similarly, the NR PHY 202B provides transport channels to the NR MAC sublayer 204B, which in turn provides logical channels to the NR RLC sublayer 206B. The NR RLC sublayer 206B in turn provides data transfer services to the NR PDCP sublayer 210. The NR PDCP sublayer 210 in turn can provide data transfer services to Service Data Adaptation Protocol (SDAP) 212 or a radio resource control (RRC) sublayer (not shown in FIG. 2). The UE 102, in some implementations, supports both the EUTRA and the NR stack, as shown in FIG. 2, to support handover between EUTRA and NR base stations and/or to support DC over EUTRA and NR interfaces. Further, as illustrated in FIG. 2, the UE 102 can support layering of NR PDCP 210 over EUTRA RLC 206A, and SDAP sublayer 212 over the NR PDCP sublayer 210.

The EUTRA PDCP sublayer 208 and the NR PDCP sublayer 210 receive packets (e.g., from an Internet Protocol (IP) layer, layered directly or indirectly over the PDCP layer 208 or 210) that can be referred to as service data units (SDUs), and output packets (e.g., to the RLC layer 206A or 206B) that can be referred to as protocol data units (PDUs). Except where the difference between SDUs and PDUs is relevant, this disclosure for simplicity refers to both SDUs and PDUs as "packets."

On a control plane, the EUTRA PDCP sublayer 208 and the NR PDCP sublayer 210 can provide signaling radio bearers (SRBs) or an RRC sublayer (not shown in FIG. 2) to exchange RRC messages or non-access-stratum (NAS) messages, for example. On a user plane, the EUTRA PDCP sublayer 208 and the NR PDCP sublayer 210 can provide data radio bearers (DRBs) to support data exchange. Data exchanged on the NR PDCP sublayer 210 can be SDAP PDUs, Internet Protocol (IP) packets, or Ethernet packets.

Next, several example scenarios in which a UE and/or a RAN perform methods for supporting conditional procedures are discussed with reference to FIGS. 3A-3E. Generally speaking, similar events in FIGS. 3A-3E are labeled with the same reference numbers, with differences discussed below where appropriate. Time flows from the upper to the lower part in these figures.

Figure 3A:
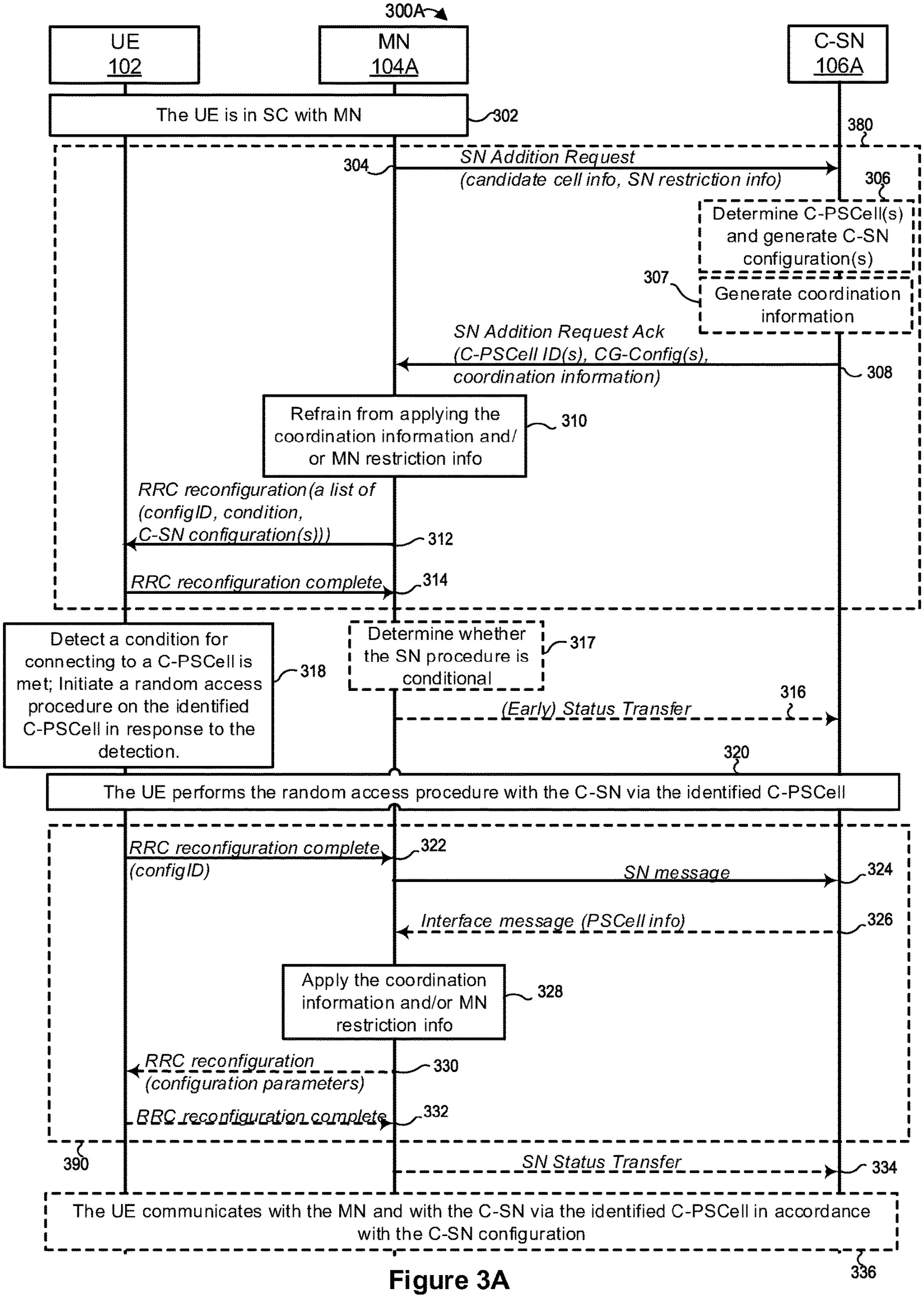
FIG. 3A illustrates an example scenario in which an MN receives multi-connectivity coordination information from the SN during an SN addition request procedure, and refrains from applying the coordination information or restriction information until determining that the UE has connected to a particular cell of the SN.

Referring first to FIG. 3A, in a scenario 300A, an MN receives multi-connectivity coordination information from the SN during an SN addition request procedure, and refrains from applying the coordination information or restriction information until determining that the UE has connected to a particular cell of the SN. In the scenario 300A, the base station 104A operates as an MN, and the base station 106A operates as a C-SN. Initially, the UE 102 operates 302 in single connectivity (SC) with the MN 104A. While in SC, the UE 102 communicates UL PDUs and/or DL PDUs with the MN 104A (e.g., via a PCell 124A) in accordance with an MN configuration.

The MN 104A then determines to configure the base station 106A as a C-SN for conditional PSCell addition (CPA) based on measurement result(s) from the UE 102, for example. In some implementations, the MN 104A can detect or estimate that the UE 102 is moving toward coverage (i.e., one or more cells) of the base station 106A based on uplink signals received from the UE 102 or positioning measurement result(s) received from the UE 102. In response to the determination, the MN 104A sends 304 an SN Addition Request message to the C-SN 106A. The MN 104A can generate candidate cell information including the measurement result(s) of the one or more cells and include the candidate cell information in the SN Addition Request message. Furthermore, the MN 104A can determine SN restriction information to restrict (values of) configuration parameters that the C-SN 106A can configure for the UE 102. The MN 104A can include the SN restriction information in the SN Addition Request message. The MN 104A may determine MN restriction information to restrict (values of) configuration parameters that the MN 104A can configure for the UE 102 when determining the SN restriction information. In some implementations, the MN restriction information and/or the SN restriction information include at least one of the fields shown in Table 1 below.

TABLE 1

| Example fields in MN and/or SN restriction information |
|---|
| powerCoordination-FR1 |
| Indicates the maximum power that the UE can use in FR1. |
| powerCoordination-FR2 |
| Indicates the maximum power that the UE can use in frequency range 2 (FR2). This field is only used in NR-DC. |
| nrdc-PC-mode-FR1 |

TABLE 1-continued

| Example fields in MN and/or SN restriction information |
| --- |
| Indicates the uplink power sharing mode that the UE uses in NR-DC FR1 (see TS 38.213 [13], clause 7.6). |
| nrdc-PC-mode-FR2 |
| Indicates the uplink power sharing mode that the UE uses in NR-DC FR2 (see TS 38.213 [13], clause 7.6). |
| overheatingAssistanceSCG |
| Contains the UE's preference on reduced configuration for NR SCG to address overheating. This field is only used in (NG)EN-DC. |
| p-maxEUTRA |
| Indicates the maximum total transmit power to be used by the UE in the E-UTRA cell group (see TS 36.104 [33]). This field is used in (NG)EN-DC and NE-DC. |
| p-maxNR-FR1 |
| Indicates the maximum total transmit power to be used by the UE in the NR cell group across all serving cells in frequency range 1 (FR1) (see TS 38.104 [12]). The field is used in (NG)EN-DC and NE-DC. |
| p-maxUE-FR1 |
| Indicates the maximum total transmit power to be used by the UE across all serving cells in frequency range 1 (FR1). |
| p-maxNR-FR1-MCG |
| Indicates the maximum total transmit power to be used by the UE in the NR cell group across all serving cells in frequency range 1 (FR1) (see TS 38.104 [12]) the UE can use in NR MCG. This field is only used in NR-DC. |
| p-maxNR-FR2-SCG |
| Indicates the maximum total transmit power to be used by the UE in the NR cell group across all serving cells in frequency range 2 (FR2) (see TS 38.104 [12]) the UE can use in NR SCG. |
| p-maxUE-FR2 |
| Indicates the maximum total transmit power to be used by the UE across all serving cells in frequency range 2 (FR2). |
| p-maxNR-FR2-MCG |
| Indicates the maximum total transmit power to be used by the UE in the NR cell group across all serving cells in frequency range 2 (FR2) (see TS 38.104 [12]) the UE can use in NR MCG. |
| pdcch-BlindDetectionSCG |
| Indicates the maximum value of the reference number of cells for PDCCH blind detection allowed to be configured for the SCG. |
| configRestrictInfo |
| Includes fields for which SgNB is explicitly indicated to observe a configuration restriction. |
| drx-ConfigMCG |
| This field contains the complete DRX configuration of the MCG. This field is only used in NR-DC. |
| drx-InfoMCG |
| This field contains the DRX long and short cycle configuration of the MCG. This field is used in (NG)EN-DC and NE-DC. |
| drx-InfoMCG2 |
| This field contains the drx-onDurationTimer configuration of the MCG. This field is only used in (NG)EN-DC. |
| fr-InfoListMCG |
| Contains information of FR information of serving cells that include PCell and SCell(s) configured in MCG. |
| maxToffset |
| Indicates the maximum Toffset value the SN is allowed to use for scheduling SCG transmissions (see TS 38.213 [13]). This field is used in NR-DC only when the fields nrdc-PC-mode-FR1-r16 or nrdc-PC-mode-FR2-r16 are set to dynamic. Value ms0dot5 corresponds to 0.5 ms, value ms0dot75 corresponds to 0.75 ms, value ms1 corresponds to 1 ms and so on. |

In some implementations, the MN 104A can determine the MN restriction information and the SN restriction information in accordance with capabilities of the UE 102. More specifically, the MN 104 determines the MN restriction information and the SN restriction information such that when the UE 102 simultaneously communicates with the MN 104 and C-SN 106A, the communication with the MN 104 and C-SN 106A does not exceed a capability of the UE 102. For example, the MN 104 can determine a maximum uplink power, that MN 104 allows the UE 102 to transmit in communication with the MN 104, in the MN restriction info, and the MN 104 can determine a maximum uplink power, that C-SN 106A allows the UE 102 to transmit in communication with the C-SN 106A, in the SN restriction information.

TABLE 2

| Example Coordination Parameters |
| --- |
| In response to receiving 304 the SN Addition Request message, the C-SN 106A determines 306 one or more C-PSCells (C-PSCell(s)) and generates one or more C-SN configurations (C-SN configuration(s)), each C-SN configuration associated with a particular C-PSCell in the C-PSCell(s), for the UE 102. For example, the C-PSCells may be the cell 126A and the cell 126C. In some implementations, the C-SN 106A determines the C-PSCell(s) and the C-SN configuration(s) taking into account the candidate cell information and the SN restriction information. The C-SN 106A transmits 308 an SN Addition Request Acknowledge message including ID(s) of the C-PSCell(s) and the C-SN configuration(s) to the MN 104A. In some implementations, for each of the C-SN configuration(s), the C-SN 106A generates a CG-Config IE including the C-SN configuration and includes the CG-Config(s) in the SN Addition Request Acknowledge message. In further implementations, the C-SN 106A can generate 307 coordination information and include the coordination information in the SN Addition Request Acknowledge message. The C-SN 106A may determine to include the coordination information in accordance with a method illustrated in FIG. 10, for example. In some implementations, the coordination information includes one or more coordination parameters. In some implementations, the C-SN 106A can include the one or more coordination parameters in the CG-Config(s) and/or the SN Addition Request Acknowledge message. For example, the coordination information can include coordination parameters such as a Resource Coordination Info IE (e.g., SgNB Resource Coordination Information IE or MR-DC Resource Coordination Information IE) associated to a particular C-PSCell, one or more power coordination parameters (e.g., powerCoordination-FR1 and/or powerCoordination-FR2), a discontinuous reception (DRX) configuration (e.g., DRX-Info or DRX-Info2). The coordination information can include coordination information for |

TABLE 2-continued

| Example Coordination Parameters |
|---|
| each of the C-PSCell(s). As another example, the coordination parameters can include one or more coordination parameters as shown in Table 2 below.configRestrictModReq |
| Used by SN to request changes to SCG configuration restrictions previously set by MN to ensure UE capabilities are respected. E.g. can be used to request configuring an NR band combination whose use MN has previously forbidden. SN only includes this field in SN-initiated procedures. |
| drx-ConfigSCG |
| This field contains the complete DRX configuration of the SCG. This field is only used in NR-DC. |
| drx-InfoSCG |
| This field contains the DRX long and short cycle configuration of the SCG. This field is used in (NG)EN-DC and NE-DC. |
| drx-InfoSCG2 |
| This field contains the drx-onDurationTimer configuration of the SCG. This field is only used in (NG)EN-DC. |
| fr-InfoListSCG |
| Contains information of FR information of serving cells that include PScell and SCells configured in SCG. |
| measuredFrequenciesSN |
| Used by SN to indicate a list of frequencies measured by the UE. |
| needForGaps |
| In NE-DC, indicates wheter the SN requests gNB to configure measurements gaps. |
| ph-InfoSCG |
| Power headroom information in SCG that is needed in the reception of PHR MAC CE of MCG |
| ph-Supplementary Uplink |
| Power headroom information for supplementary uplink. In the case of (NG)EN-DC and NR-DC, this field is only present when two UL carriers are configued for a serving cell and one UL carrier reports type1 PH while the other reports type 3 PH. |
| ph-Type1or3 |
| Type of power headroom for a certain serving cell in SCG (PSCell and activated SCells). Value type1 refers to type 1 power headroom, value type3 refers to type 3 power headroom. (See TS 38.321 [3]). |
| ph-Uplink |
| Power headroom information for uplink. |
| pSCellFrequency, pSCellFrequencyEUTRA |
| Indicates the frequency of PSCell in NR (i.e., pSCellFrequency) or E-UTRA (i.e., pSCellFrequencyEUTRA). In this version of the specification, pSCellFrequency is not used in NE-DC whereas pSCellFrequencyEUTRA is only used in NE-DC. pSCellFrequency indicates the absoluteFrequencySSB. |
| reportCGI-RequestNR, reportCGI-RequestEUTRA |
| Used by SN to indicate to MN about configuring reportCGI procedure. The request may optionally contain information about the cell for which SN intends to configure reportCGI procedure. In this version of the specification, the reportCGI-RequestNR is used in (NG)EN-DC and NR-DC whereas reportCGI-RequestEUTRA is used only for NE-DC. |
| requestedBC-MRDC |
| Used to request configuring a band combination and corresponding feature sets which are forbidden to use by MN (i.e. outside of the allowedBC-ListMRDC) to allow re-negotiation of the UE capabilities for SCG configuration. |
| requestedMaxInterFreqMeasIdSCG |
| Used to request the maximum number of allowed measurement identities to configure for inter-frequency measurement. This field is only used in NR-DC. |
| requestedMaxIntraFreqMeasIdSCG |
| Used to request the maximum number of allowed measurement identities to configure for intra-frequency measurement on each serving frequency. |
| requestedPDCCH-BlindDetectionSCG |
| Requested value of the reference number of cells for PDCCH blind detection allowed to be configured for the SCG. |
| requestedP-MaxEUTRA |
| Requested value for the maximum power for the serving cells the UE can use in E-UTRA SCG. This field is only used in NE-DC. |
| requestedP-MaxFR1 |
| Requested value for the maximum power for the serving cells on frequency range 1 (FR1) in this secondary cell group (see TS 38.104 [12]) the UE can use in NR SCG. |
| requestedP-MaxFR2 |
| Requested value for the maximum power for the serving cells on frequency range 2 (FR2) in this secondary cell group the UE can use in NR SCG. This field is only used in NR-DC. |
| selectedBandCombination |
| Indicates the band combination selected by SN in (NG)EN-DC, NE-DC, and NR-DC. The SN should inform the MN with this field whenever the band combination and/or feature set it selected for the SCG changes (i.e. even if the new selection concerns a band combination and/or feature set that is allowed by the allowedBC-ListMRDC) |
| selectedToffset |
| Indicates the value used by the SN for scheduling SCG transmissions (i.e. $T_{proc,\ SCG}^{max}$, see TS 38.213 [13]). This field is used in NR-DC only when the fields nrdc-PC-mode-FR1-r16 or nrdc-PC-mode-FR2-r16 are set to dynamic. The SN can only indicate a value that is less than or equal to maxToffset received from MN. This field is used in NR-DC only when MN has included the field maxToffset in CG-ConfigInfo. Value ms0dot5 corresponds to 0.5 ms, value ms0dot75 corresponds to 0.75 ms, value ms1 corresponds to 1 ms and so on. |
| servCellInfoListSCG-EUTRA |
| Indicates the carrier frequency and the transmission bandwidth of the serving cell(s) in the SCG in intra-band NE-DC. The field is needed when MN and SN operate serving cells in the same band for either contiguous or non-contiguous intra-band band combination or LTE NR inter-band band combinations where the frequency range of the E-UTRA band is a subset of the frequency range of the NR band (as specified in Table 5.5B.4.1-1 of TS 38.101-3 [34]) in NE-DC. |
| servCellInfoListSCG-NR |
| Indicates the frequency band indicator, carrier center frequency, UE specific channel bandwidth and SCS of the serving cell(s) in the SCG in intra-band (NG)EN-DC. The field is needed when MN and SN operate serving cells in the same band for either contiguous or non-contiguous intra-band band combination or LTE NR inter-band band combinations where the frequency range of the E-UTRA band is a subset of the frequency range of the NR band (as specified in Table 5.5B.4.1-1 of TS 38.101-3 [34]) in (NG)EN-DC. |

TABLE 2-continued

| Example Coordination Parameters |
| --- |
| transmissionBandwidth-EUTRA<br>Indicates the transmission bandwidth on an E-UTRA carrier frequency as defined by the parameter Transmission Bandwidth Configuration "NRB" TS 36.104 [33]. The values rb6, rb15, rb25, rb50, rb75, rb100 indicate 6, 15, 25, 50, 75 and 100 resource blocks respectively.<br>ueAssistanceInformationSCG<br>Includes for each UE assistance feature associated with the SCG, the information last reported by the UE in the NR UEAssistanceInformation message for the SCG, if any. |

In some implementations, the C-SN 106A includes SN restriction information in the SN Addition Request Acknowledge message, which the MN 104A may use to determine the MN restriction information.

After receiving 308 the SN Addition Request Acknowledge message, the MN 104A refrains 310 from applying the coordination information and/or the MN restriction information. That is, the MN 104A does not take into account the coordination information and/or the MN restriction information when the MN 104A performs communication with the UE 102.

The MN 104A may include the C-SN configuration(s) in an RRC reconfiguration message (e.g., RRCConnectionReconfiguration message or RRCReconfiguration message), and transmits 312 the RRC reconfiguration message to the UE 102. In response, the UE 102 transmits 314 an RRC reconfiguration complete message (e.g., RRCConnectionReconfigurationComplete message or RRCReconfigurationComplete message) to the MN 104A. In some implementations, the MN 104A can assign a particular configuration ID (e.g., condReconfigId or CondReconfigurationId) for each of the C-SN configuration(s). For example, in cases where the C-SN configuration(s) (or the CG-Config(s)) include the C-SN configurations 1, . . . , N (N is an integer larger than zero), the MN 104A can assign configuration ID 1, . . . , ID N for the C-SN configurations 1, . . . . N, respectively. In such cases, the MN 104A can include the configuration ID 1, . . . , ID N in the RRC reconfiguration message. In such implementations, the MN 104A can include, in the RRC reconfiguration, trigger condition configurations 1, . . . , N for the C-SN configurations 1, . . . , N, respectively. The MN 104A can generate the trigger condition configurations or receive the trigger condition configurations from the C-SN 106A. Each of the trigger condition configurations can configure one or more conditions which triggers the UE 102 to connect to the C-SN 106A via a particular C-PSCell configured in a particular C-SN configuration. In such cases, the MN 104A can include the condition configuration identifiers CID 1, . . . , CID N in the RRC reconfiguration message. In some implementations, the MN 104A can generate conditional (re) configuration fields/IEs 1, . . . , N, including the C-SN configurations 1, . . . , N and the trigger condition configurations 1, . . . , N, respectively, and transmits 312 the RRC reconfiguration message including the conditional (re) configuration fields/IEs to the UE 102. In other implementations, the MN 104A can generate RRC container messages (e.g., e.g., RRCConnectionReconfigurationComplete messages or RRCReconfigurationComplete messages) 1, . . . , N including the C-SN configurations 1, . . . . N, respectively, generate conditional (re) configuration fields/IEs 1, . . . , N including the RRC container messages 1, . . . , N and the condition configurations 1, . . . , N, respectively, and transmits 312 the RRC reconfiguration message including the conditional configuration fields/IEs to the UE 102.

In some implementations, the MN 104A can transmit an SN message (e.g., SN Reconfiguration Complete message) to the C-SN 106A to indicate that the UE 102 receives the C-SN configuration(s), in response to or after receiving the RRC reconfiguration complete message. In other implementations, the MN 104A refrains from sending an SN message to the C-SN 106 to indicate the UE 102 receives the C-SN configuration(s). Events 304, 306, 307. 308, 310, 312 and 314 collectively define a conditional SN addition preparation procedure 380.

After receiving 314 the RRC reconfiguration complete message or an acknowledgement (e.g., RLC acknowledgement or hybrid automatic repeat request (HARQ) acknowledgement) for a PDU (e.g., RLC PDU or MAC PDU) including the RRC reconfiguration message, the MN 104A can (determine to) send 316 an Early Status Transfer message to the C-SN 106A to transfer a COUNT value of the first downlink SDU that the MN 104A forwards to the C-SN 106A or a COUNT value for discarding of already forwarded downlink SDUs for each of DRB(s) of the UE 102. The Early Status Transfer message may be an Early Sequence Number Status Transfer message. The MN 104A can send 316 the Early Status Transfer message without receiving an interface message indicating the UE 102 connects to the C-SN 106A.

As will be discussed with reference to FIGS. 5A-5B, after performing 380 the conditional SN addition preparation procedure to configure the C-SN 106A as a C-SN, the MN 104A may determine to transmit 316 the Early Status Transfer message to the C-SN 106A. More particularly, after performing 380 an SN procedure with the C-SN 106A, the MN determines 317 whether the SN procedure is a conditional procedure or an immediate procedure. In response to determining 317 that the SN procedure is a conditional procedure (and early data forwarding is necessary), the MN transmits 316 the Early Status Transfer message.

The UE 102 may use the one or more conditions to determine whether to connect to the one of the C-PSCell(s). If the UE 102 detects 318 that a condition for connecting to C-PSCell 126A is satisfied, the UE 102 connects to the C-PSCell 126A. That is, the condition (or "triggering condition") triggers the UE 102 to connect to the C-PSCell 126A or to execute the C-SN configuration concerning the C-PSCell 126A. However, if the UE 102 does not detect that the condition is satisfied, the UE 102 does not connect to the C-PSCell 126A. In response to the detection, the UE 102 initiates a random access procedure on the C-PSCell 126A. In response to the initiation, the UE 102 performs 320 the random access procedure with the C-SN 106A via the C-PSCell 126A. In response to the detection or initiation 318, the UE 102 sends 322 an RRC reconfiguration complete message to the MN 104A. The UE 102 can send 322 the RRC reconfiguration complete message before, during or after the random access procedure.

In some implementations, the UE 102 may indicate that the UE 102 has selected or connected to a C-PSCell of a particular C-SN (e.g., the C-PSCell 126A), in the RRC reconfiguration complete message that the UE 102 transmits 322. For example, the UE 102 can receive a synchronization signal block (SSB) and/or system information broadcast by the C-SN 106A on the C-PSCell 126A. The UE 102 can obtain a physical cell identity (PCI) of the C-PSCell 126A from the SSB or obtain a cell global identity (CGI) from the system information. The RRC reconfiguration complete message can include the PCI and/or the CGI to indicate that the UE 102 has selected or connected to the C-PSCell 126A. In other implementations, the UE 102 may indicate, in the RRC reconfiguration complete message, that the UE 102 has executed one of the C-SN configuration(s). The RRC reconfiguration complete message, for example, may include a configuration ID corresponding to the particular C-SN configuration (as shown in FIG. 3A). The MN 104A can use the configuration ID to identify or determine the ID of the C-PSCell 126A (e.g., the PCI and/or the CGI of the C-PSCell 126A). The MN 104A can also use the configuration ID to identify or determine the C-SN configuration or the CG-Config including the C-SN configuration. Thus, based on the RRC reconfiguration complete message, the MN 104A determines which C-PSCell was selected by the UE 102.

In response to or after receiving 322 the RRC reconfiguration complete message, the MN 104A can send 324 an SN message to the C-SN 106A. In some implementations, the SN message can be an SN Reconfiguration Complete message. In other implementations, the SN message can be an RRC Transfer message. In yet other implementations, the SN message can be a new interface message (e.g., XnAP or X2AP message) defined in 3GPP 38.423 or 36.423 release 17 specification. In some implementations, the UE 102 can include an SN RRC message (e.g., RRCReconfigurationComplete message) in the RRC reconfiguration complete message that the UE 102 transmits at event 322. In such cases, the MN 104A can include the SN RRC message in the SN message.

In some implementations, the random access procedure can be a four-step random access procedure or a two-step random access procedure. In other implementations, the random access procedure can be a contention-based random access procedure or a contention-free random access procedure. For example, the UE 102 may include RRC reconfiguration complete message in a message 3 of the four-step random access procedure or in a message A of the two-step random access procedure.

After the UE 102 and the C-SN 106A successfully complete the random access procedure (i.e., successful contention resolution) with each other via the C-PSCell 126A, the C-PSCell 126A and the C-SN 106A becomes a PSCell and an SN, respectively, for the UE 102. After the C-SN 106A successfully completes the random access procedure with the UE 102, the C-SN 106A can send 326 an interface message (e.g., SN Modification Required message or a success indication message) including PSCell information of PSCell 126A to the MN 104A. The PSCell information can include a cell global identity (CGI), a physical cell identity (PCI), and/or an absolute radio frequency channel number (ARFCN) identifying a DL carrier frequency of the PSCell 126A. In some implementations, the C-SN 106A can send 326 the interface message in response to or after receiving the SN message or performing 320 the random access procedure. In some implementations, the interface message further includes SN restriction information.

In response to or after receiving 322 the RRC reconfiguration complete message or 326 the interface message, the MN 104A applies 328 the coordination information and/or the MN restriction information. In response to applying 328 the coordination information and/or the MN restriction information, the MN 104A can send 330 an RRC reconfiguration message including configuration parameters to the UE 102. In some implementations, the configuration parameters 330 may reconfigure or release (values of) configuration parameters that the UE 102 uses to communicate with the MN 104A. In other implementations, the configuration parameters 330 may be new configuration parameters to configure the UE 102 to communicate with the MN 104A. In response to the RRC reconfiguration message 330, the UE 102 can send 332 an RRC reconfiguration message to the MN 104A. The events 322, 324, 326, 328, 330, and 332 are collectively referred to in FIG. 3A as a Conditional SN Addition execution procedure 390.

In response to or after receiving 332 the RRC reconfiguration complete message or 326 the interface message, the MN 104A can send 334 an Sequence Number Status Transfer message to transfer uplink PDCP SN and Hyper Frame Number (HFN) receiver status and/or downlink PDCP SN and HFN transmitter status for each of DRB(s) of the UE 102. In contrast to event 316, the MN 104A sends 334 a (non-early) Sequence Number Status Transfer message.

After the UE 102 successfully completes at 320 the random access procedure, the UE 102 communicates 336 with the MN and with the SN via the C-PSCell 126A in accordance with the C-SN configuration configuring the C-PSCell 126A.

With continued reference to FIG. 3A, the C-SN configuration in some implementations can be a complete and self-contained configuration (i.e., a full configuration). The C-SN configuration may include a full configuration indication (an information element (IE) or a field) that identifies the C-SN configuration as a full configuration. The UE 102 in this case can use the C-SN configuration to communicate with the SN 106A without relying on an SN configuration. On the other hand, the C-SN configuration in other cases can include a "delta" configuration, or one or more configurations that augment a previously received SN configuration. In these cases, the UE 102 can use the delta C-SN configuration together with the SN configuration to communicate with the SN 106A.

The C-SN configuration can include multiple configuration parameters for the UE 102 to apply when communicating with the SN 106A via a C-PSCell 126A. The multiple configuration parameters may configure the C-PSCell 126A and zero, one, or more candidate secondary cells (C-SCells) of the SN 106A to the UE 102. The multiple configuration parameters may configure radio resources for the UE 102 to communicate with the SN 106A via the C-PSCell 126A and zero, one, or more C-SCells of the SN 106A. The multiple configuration parameters may configure zero, one, or more radio bearers. The one or more radio bearers can include an SRB and/or one or more DRBs.

In some implementations, the C-SN configuration can include a group configuration (CellGroupConfig) IE that configures the C-PSCell 126A and zero, one, or more C-SCells of the SN 106A. In one implementation, the C-SN configuration includes a radio bearer configuration. In another implementation, the C-SN configuration does not include a radio bearer configuration. For example, the radio bearer configuration can be a RadioBearerConfig IE, DRB-ToAddModList IE or SRB-ToAddModList IE, DRB-ToAddMod IE or SRB-ToAddMod IE. In various implementations, the C-SN configuration can be an RRCReconfiguration message, RRCReconfiguration-IEs, or the CellGroupConfig IE conforming to 3GPP specification 38.331 v16.5.0 or an earlier version. The full configuration indication may be a field or an IE conforming to 3GPP specification 38.331 v16.5.0 or an earlier version. In other implementations, the C-SN configuration can include an SCG-ConfigPartSCG-r12 IE that configures the C-PSCell 126A and zero, one, or more C-SCells of the SN 106A. In some implementations, the C-SN configuration is an RRC-ConnectionReconfiguration message, RRCConnectionReconfiguration-IEs, or the ConfigPartSCG-r12 IE conforming to 3GPP specification 36.331 v16.5.0 or an earlier version. The full configuration indication may be a field or an IE conforming to 3GPP specification 36.331 v16.5.0 or an earlier version.

Still referring to FIG. 3A, the base station 106A in some cases can include the CU 172 and one or more DUs 174 as illustrated in FIG. 1C. For each of the C-SN configuration(s), the one or more DUs 174 can generate the C-SN configuration. Alternatively, for each of the C-SN configuration(s), the one or more DUs 174 can generate a portion of the C-SN configuration and the CU 172 may generate the rest of the C-SN configuration. For example, the UE 102 performs 320 the random access procedure with a first DU of the one or more DUs 174 operating the (C-)PSCell 126A and the first DU may identify the UE 102 in the random access procedure. In this case, the UE 102 communicates 336 with the SN 106A via the first DU.

The first DU of the C-SN 106A operating the C-PSCell 126A may generate the C-SN configuration configuring the C-PSCell 126A or a portion of the C-SN configuration and send the C-SN configuration or the portion of the C-SN configuration to the CU 172. In cases of generating a portion of the C-SN configuration, the CU 172 generates the rest of the C-SN configuration. In some scenarios or implementations, the first DU generates each of the other C-SN configuration(s). Alternatively, for each of the other C-SN configuration(s), the first DU generates a portion of the C-SN configuration and the CU 172 generates the rest of the C-SN configuration. In other scenarios or implementations, the first DU generates at last one first C-SN configuration in the C-SN configuration(s). Alternatively, for each of the at least one first C-SN configuration, the first DU generates a portion of the C-SN configuration and the CU 172 generates the rest of the C-SN configuration. A second DU of the C-SN 106A, the second DU included in the one or more DUs 174, generates at least one second C-SN configuration in the C-SN configuration(s). Alternatively, for each of the at least one second C-SN configuration, the second DU generates a portion of the C-SN configuration and the CU 172 generates the rest of the C-SN configuration.

Figure 3B:
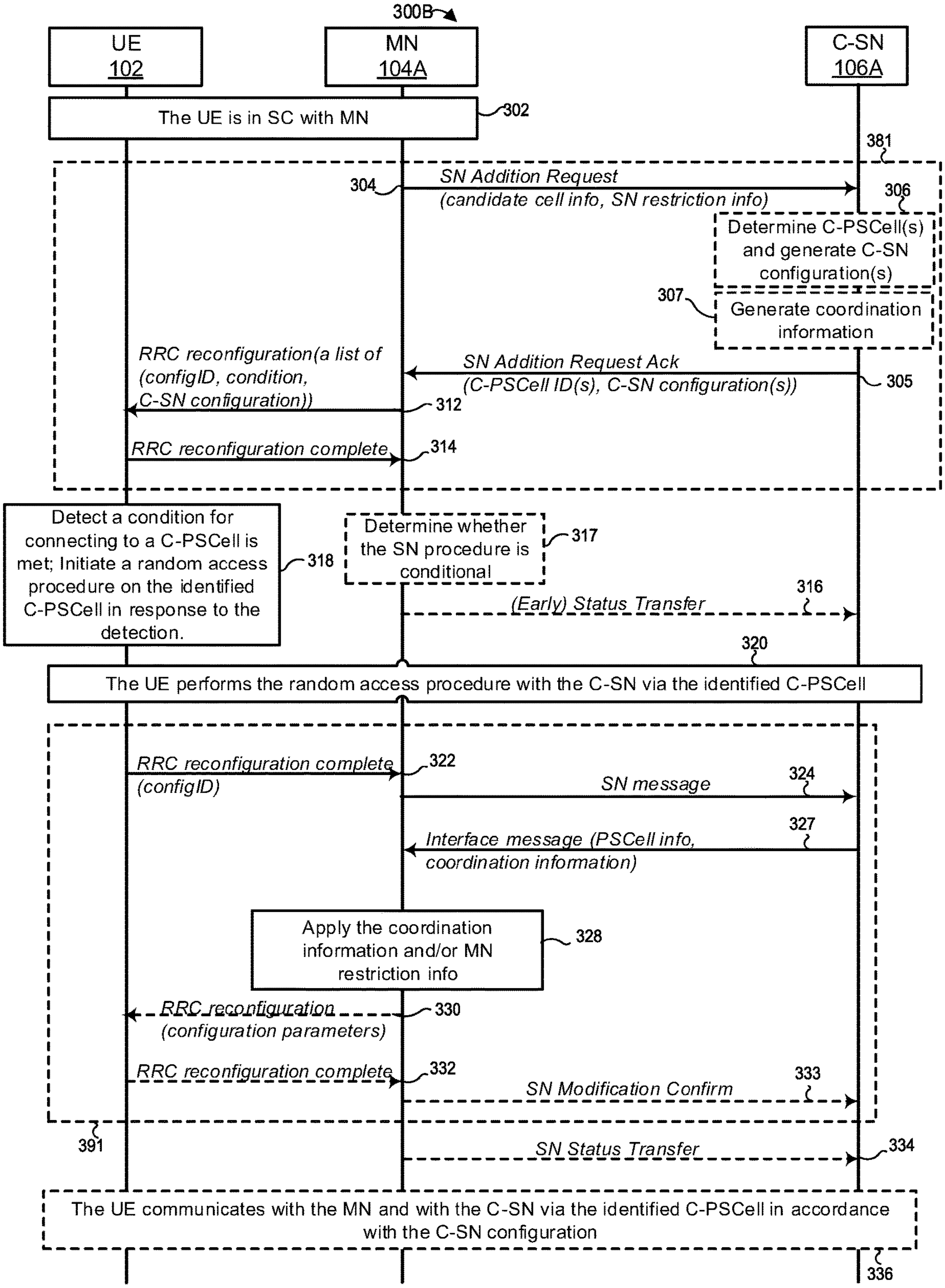
FIG. 3B illustrates an example scenario in which an MN performs an SN addition request procedure with an SN, but receives multi-connectivity coordination information from the C-SN after the UE has connected to a particular cell of the SN.

Referring next to FIG. 3B, a scenario 300B is similar to the scenario 300A. However, in the scenario 300B, the MN 104A receives coordination information from the C-SN after the UE has connected to a particular cell of the SN. More particularly, in response to the SN Addition Request message that the C-SN 106A receives 304, the C-SN 106A transmits 305 an SN Addition Request Acknowledge message including ID(s) of the C-PSCell(s) and the C-SN configuration(s) to the MN 104A and omitting multi-connectivity coordination information. In some implementations, for each of the C-SN configuration(s), the C-SN 106A generates a CG-Config IE including the C-SN configuration and includes the CG-Config(s) in the SN Addition Request Acknowledge message. At a later time, when the C-SN 106A transmits 327 an interface message to the MN 104A after the UE 102 connects to the C-SN 106A, the C-SN 106A includes in the interface message the multi-connectivity coordination information. In some implementations, the C-SN 106A can send 327 the interface message in response to or after receiving 324 the SN message or performing 320 the random access procedure. The interface message includes coordination information. In some implementations, the interface message includes SN restriction information. The MN 104A may use the SN restriction information to determine the MN restriction information.

In some implementations, the interface message 327 is an existing X2AP message defined in 3GPP specification 36.423 v16.6.0 or an earlier version, or an existing XnAP message defined in 3GPP specification 38.423 v.16.6.0 or an earlier version. In other implementations, the interface message 327 is a new X2AP message defined in 3GPP release 17 specification 36.423, or a new XnAP message defined in 3GPP release 17 specification 38.423. In some implementations, the interface message 327 is another type of message such as an SN Modification Required message, an NG-RAN node Configuration Update message, or a E-UTRA-NR Cell Resource Coordination Request message. The interface message 327 may include a SgNB Coordination Assistance Information IE or a NR Resource Coordination Information IE for Physical Resource Block (PRB) coordination.

After receiving 327 the coordination information, the MN 104A applies 328 the coordination information and/or the MN restriction information. The MN 104A may transmit 333 an SN Modification Confirm message to the C-SN 106A (now SN 106A) after applying 328 the coordination information and/or MN restriction information.

Events 304, 306, 307, 305, 312 and 314 collectively define a Conditional SN Addition preparation procedure 381. Events 322, 324, 327, 328, 330, 332, and 333 collectively define a Conditional SN Addition execution procedure 391. In some implementations, event 307 in the scenario 300B occurs after the Conditional SN Addition preparation procedure 381 and before the C-SN 106A transmits 327 the interface message (e.g., during the Conditional SN Addition execution procedure 391).

Figure 3C:
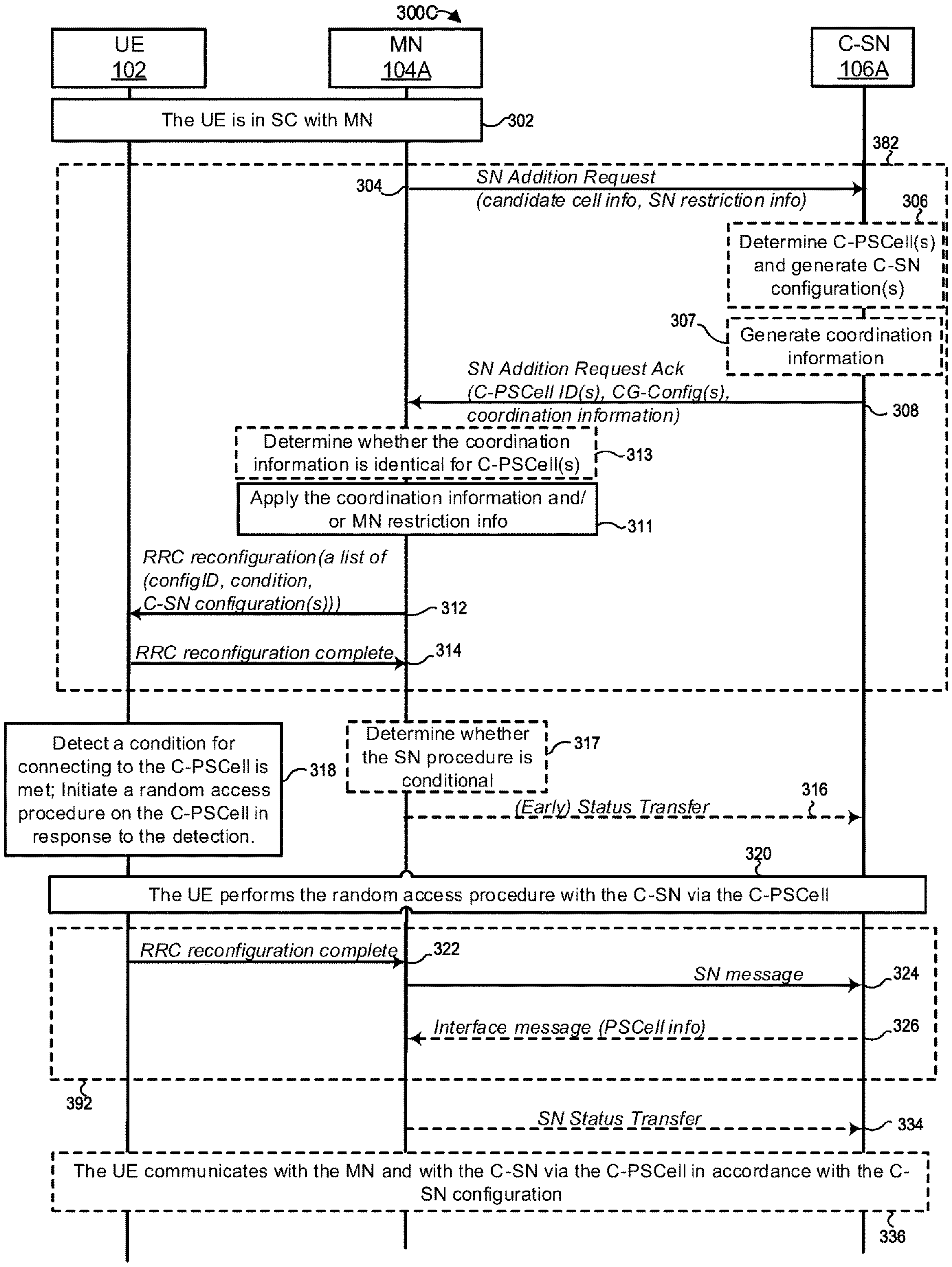
FIG. 3C illustrates an example scenario in which an SN provides, to the MN, the same multi-connectivity coordination information for all candidate cells during an SN addition request procedure, and the MN applies the coordination information immediately.

Turning to FIG. 3C, during the scenario 300C, the C-SN 106A provides, to the MN 104, the same multi-connectivity coordination information for all candidate cells during an SN addition request procedure, and the MN applies the coordination information immediately. In particular, when the C-SN 106A generates 307 coordination information, the C-SN 106A generates identical coordination information for all of the C-PSCell(s) (or generates one set of coordination information that applies to all of the C-PSCell(s)). Thus, coordination parameters included in the coordination information are identical for all of the C-PSCell(s).

The C-SN 106A transmits 308 an SN Addition Request Acknowledge message including C-PSCell ID(s), CG-Config(s), and the coordination information. The MN 104A determines 313 whether the coordination information is identical for the C-PSCell(s). For example, the MN 104A can decode coordination information for each of the C-PSCell(s) and determine 317 that the coordination information is identical for each of the C-PSCell(s). As another example, the MN 104A can determine 317 that the coordination information is identical for all of the C-PSCell(s) if the coordination information includes one set of coordination information for all C-PSCell(s). After or in response to determining 313 that the coordination information is identical for all C-PSCell(s), the MN 104A applies 311 the coordination information and/or MN restriction information. In some implementations, the MN 104A applies 311 both the coordination information and the MN restriction information. In other implementations, the MN 104A applies 311 the coordination information and waits to apply the restriction information (or applies 311 the restriction information and waits to apply the coordination information) (e.g., until after the MN 104A receives 322 an RRC reconfiguration complete message from the UE 102 indicating that the UE 102 has connected to the C-PSCell 126A, or until after receiving 326 an interface message). Events 304, 306, 307, 308, 313, 311, 312, and 314 collectively define a Conditional SN Addition preparation procedure 382.

The scenario 300C then proceeds similarly to the scenario 300A, except that the MN 104A has already applied 311 the coordination information and/or MN restriction information before the UE 102 connects 320 to the C-PSCell 126A. Events 322, 324, and 326 collectively define a Conditional SN Addition execution procedure 392.

Figure 3D:
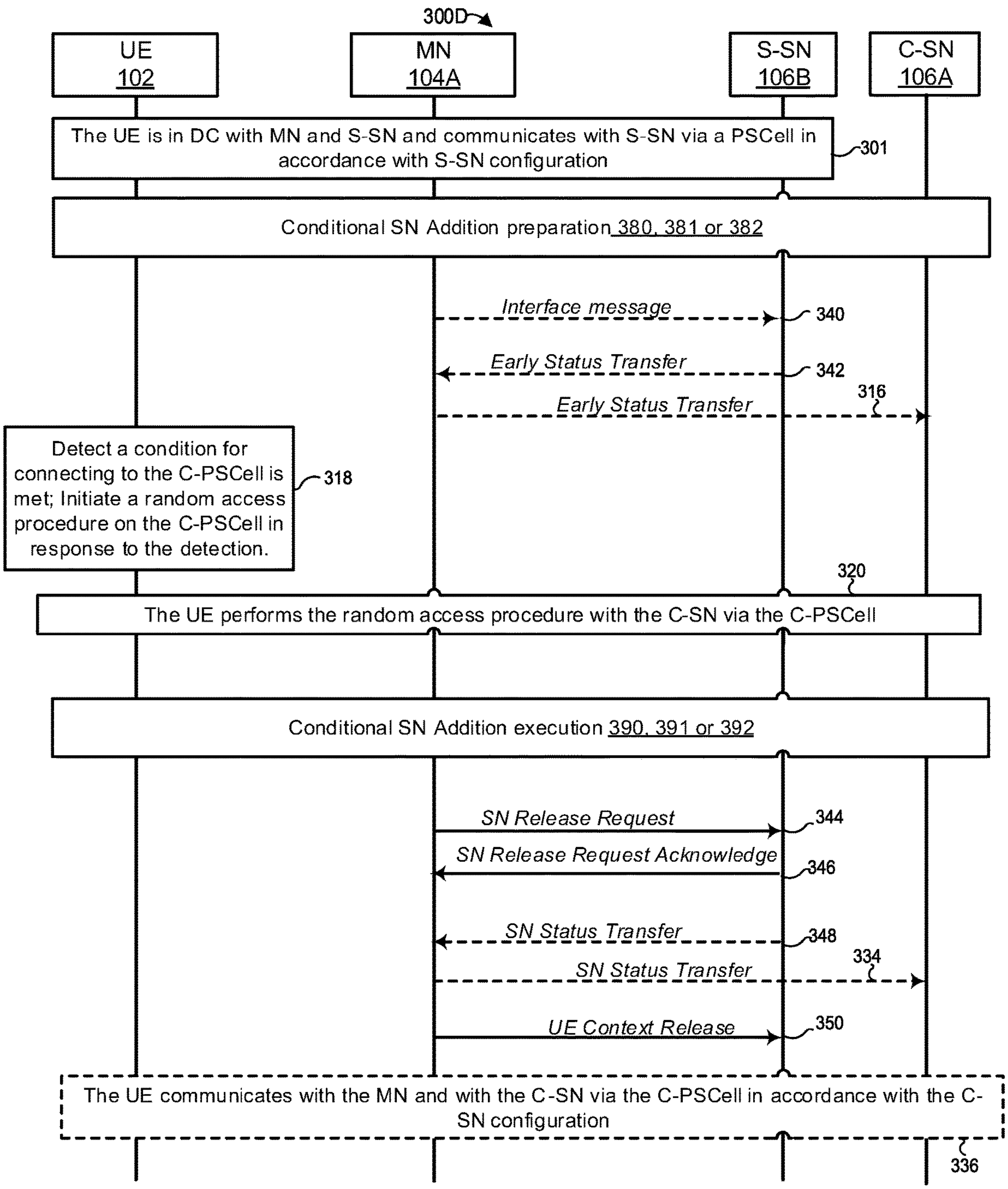
FIG. 3D illustrates a scenario in which an MN initiates a conditional SN change procedure, and applies multi-connectivity coordination information as in FIGS. 3A-C.
Figure 3E:
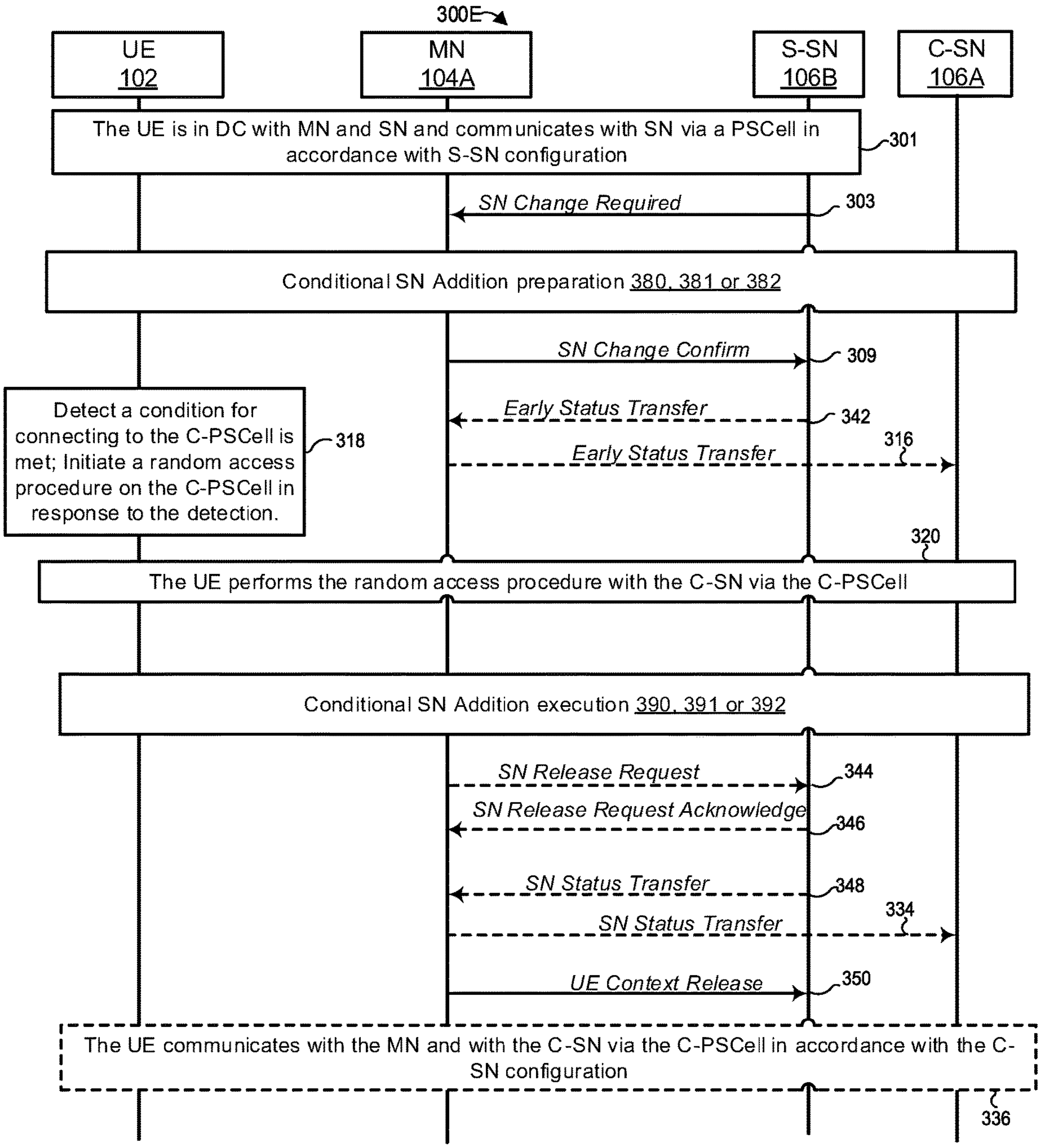
FIG. 3E illustrates a scenario in which an SN initiates a conditional SN change procedure, and the MN applies multi-connectivity coordination information according as in FIGS. 3A-C.

Turning to FIGS. 3D-3E, scenarios 300D and 300E may each be similar to any one of the scenarios 300A-300C. However, the scenarios 300D and 300E include an MN-initiated conditional SN change procedure and an SN-initiated conditional SN procedure, respectively. Referring first to FIG. 3D, in the scenario 300D the UE 102 operates 301 in dual connectivity (DC) with the MN 104A and a base station 106B, operating as an S-SN. The UE 102 communicates with the S-SN 106B via a PSCell in accordance with an S-SN configuration.

At a later time, the MN 104A determines to configure the base station 106A as a C-SN for conditional PSCell change (CPC). The MN 104A can make this determination in a similar manner as described above for CPA in FIG. 3A. To configure the C-SN 106A as a C-SN, the MN 104A can perform any one of the Conditional SN Addition preparation procedures 380, 381, or 382 with the C-SN 106A and the UE 102. After configuring the C-SN 106A, the MN 104A may transmit 340 an interface message to the S-SN 106B. The S-SN 106B may transmit 342 an Early Status Transfer message to the MN 104A. The S-SN 106B may transmit 342 the Early Status Transfer message in response to receiving 340 the interface message. The MN 104A also transmits 316 an Early Status Transfer message to the C-SN 106A, as in FIG. 3A.

In some implementations, the interface message 340 is an existing X2AP message defined in 3GPP specification 36.423 v16.6.0 or earlier version. For example, the interface message 340 can be an X2-U Address Indication or a Data Forwarding Address Indication. In one implementation, the MN 104 can include an existing field or a new field in the existing X2AP message to indicate to the S-SN 106B to send 342 an Early Status Transfer message. In another implementation, the MN 104 can include a new field in the existing X2AP message to indicate to the SN 106B that the UE 102 has been configured with a conditional configuration for CPC. In other implementations, the interface message 340 is a new XnAP message defined in a 3GPP release 17 specification. For example, the interface message 340 can be an Early Status Transfer Triggering message or a CPC Triggered message or a Conditional PSCell Change Notification.

In some implementations, the interface message 340 is an existing XnAP message defined in 3GPP specification 38.423 v16.6.0 or an earlier version. For example, the interface message 340 can be an Xn-U Address Indication. In one implementation, the MN 104 can include an existing field or a new field in the existing XnAP message to indicate to the S-SN 106B to send 342 an Early Status Transfer message. In another implementation, the MN 104 can include a new field in the existing XnAP message to indicate to the SN 106B that the UE 102 has been configured with a conditional configuration for CPC. In other implementations, the interface message 340 is a new XnAP message defined in a 3GPP release 17 specification. For example, the interface message 340 can be an Early Status Transfer Triggering message or a CPC Triggered message or a Conditional PSCell Change Notification.

After the UE 102 detects 318 a condition for connecting to the C-PSCell 126A and connects 320 to the C-SN 106A during via a random access procedure, the MN 104A, UE 102, and C-SN 106A can perform one of the Conditional SN Addition execution procedures 390, 391, or 392, based on which the Conditional SN Addition preparation procedure was performed previously during the scenario 300D (e.g., if the MN 104A and C-SN 106A perform the Conditional SN Addition preparation procedure 380, then the MN 104A and C-SN 106A can perform the Conditional SN Addition execution procedure 390).

After or in response to the Conditional SN Addition execution procedure 390, 391, or 392, the MN 104A transmits 344 an SN Release Request message to the S-SN 106B to release the S-SN 106B from DC. For example, the MN 104A can transmit the SN Release Request message in response to or after receiving 322 the RRC reconfiguration complete message or 326/327 the interface message. The SN Release Request message may trigger the S-SN 106B to release the PSCell for the UE 102. In response to the SN Release Request message, the S-SN 106B transmits 346 an SN Release Request Acknowledge message to the MN 104A. The S-SN 106B may also transmit 348 an SN Status Transfer message to the MN 104A, and the MN 104A can transmit 334 an SN Status Transfer message to the C-SN 106A, where the acronym "SN" in "SN Status Transfer" message refers to "Sequence Number." Further, the MN 104A may transmit 350 a UE Context Release message to the S-SN 106B to instruct the S-SN 106B to release a UE context for the UE 102.

Turning to FIG. 3E, the scenario 300E is similar to the scenario 300D except that the CPC is SN-initiated. The S-SN 106B determines to configure the base station 106A as a C-SN for CPC. The S-SN 104B can make this determination based on measurement result(s) from the UE 102, for example, similar to the manner in which the MN 104A can determine to initiate CPA as discussed above for FIG. 3A. In response to the determination, the S-SN 106B sends 303 an SN Change Required message to the MN 104A. To configure the C-SN 106A as a C-SN, the MN 104A can perform any one of the Conditional SN Addition preparation procedures 380, 381, or 382 with the C-SN 106A and the UE 102. After configuring the C-SN 106A, the MN 104A may transmit 309 an SN Change Confirm message to the S-SN 106B. The S-SN 106B may send 342 an Early Status Transfer message to the MN 104A in response to the SN Change Confirm message.

After the UE 102 detects 318 a condition for connecting to the C-PSCell 126A and connects 320 to the C-SN 106A during via a random access procedure, the MN 104A, UE 102, and C-SN 106A can perform one of the Conditional SN Addition execution procedures 390, 391, or 392, based on which the Conditional SN Addition preparation procedure was performed previously during the scenario 300E. In contrast to FIG. 3D, the MN 104A may or may not transmit 344 an SN Release Request to the S-SN 106B, because the S-SN 106B initiated the CPC. In some implementations, instead of the SN Release Request message, the MN 104A can send to the S-SN 106B an interface message to indicate that CPC executed in response to receiving a RRC reconfiguration complete message in the conditional SN addition execution procedure. For example, the interface message can be a Conditional SN Change Success Message or an Xn-U Address Indication message.

FIGS. 4A-4B, 5A-5B, 6-8, 9A-9B, and 10-12 are flow diagrams depicting example methods that a base station (e.g., the base station 104A, 104B, 106A, or 106B) can implement to support conditional procedures in accordance with the techniques of this disclosure. As indicated at various points throughout this disclosure, the example methods depicted in FIGS. 4A-4B, 5A-5B, 6-8, 9A-9B, and 10-12 may be implemented during the scenarios 300A-300E described above.

Figure 4A:
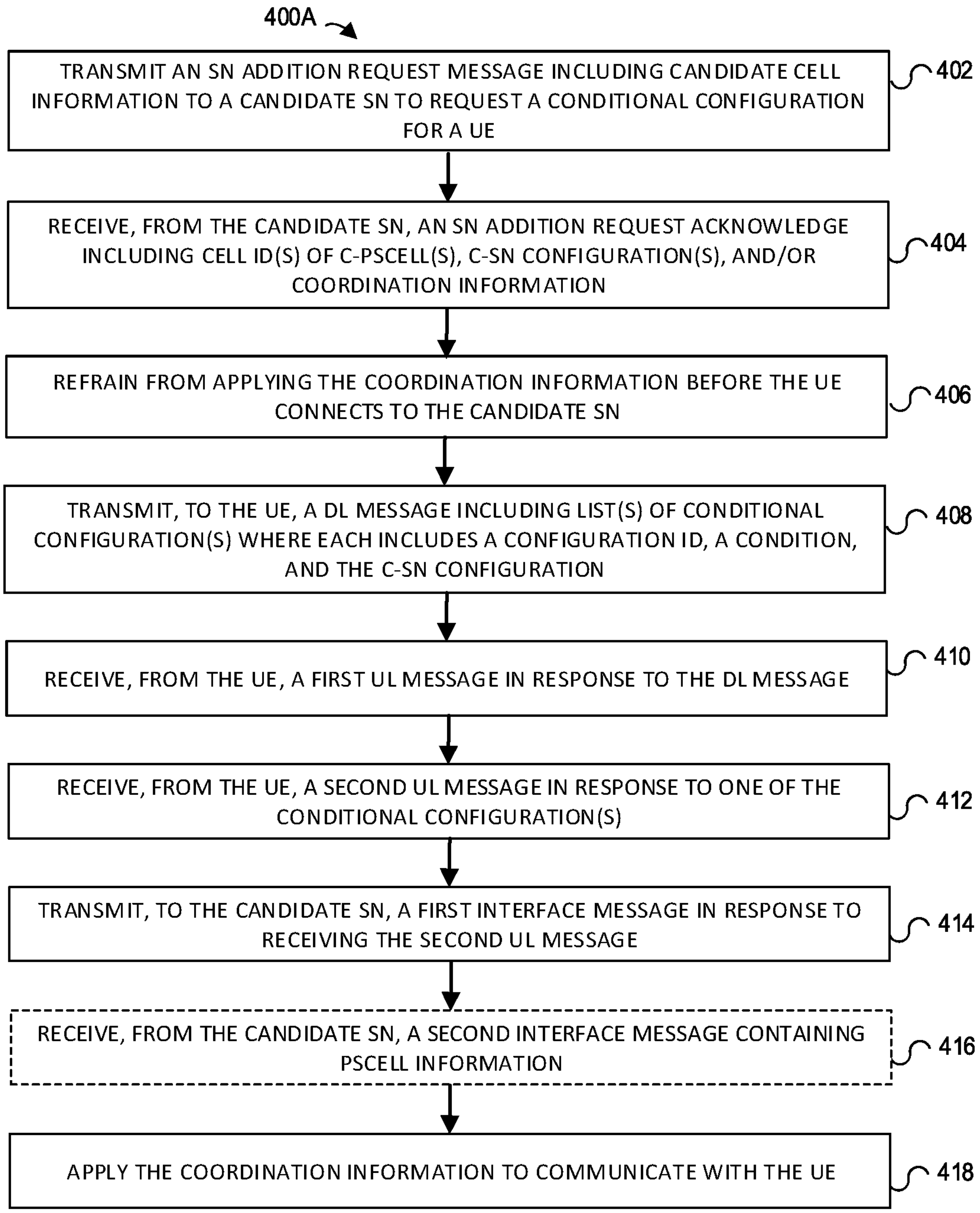
FIG. 4A is a flow diagram of an example method for delayed application of multi-connectivity coordination information received during a conditional SN configuration procedure, until after determining to which secondary cell the UE is connected, where the method can be implemented in a base station of FIG. 1A operating as an MN.
Figure 4B:
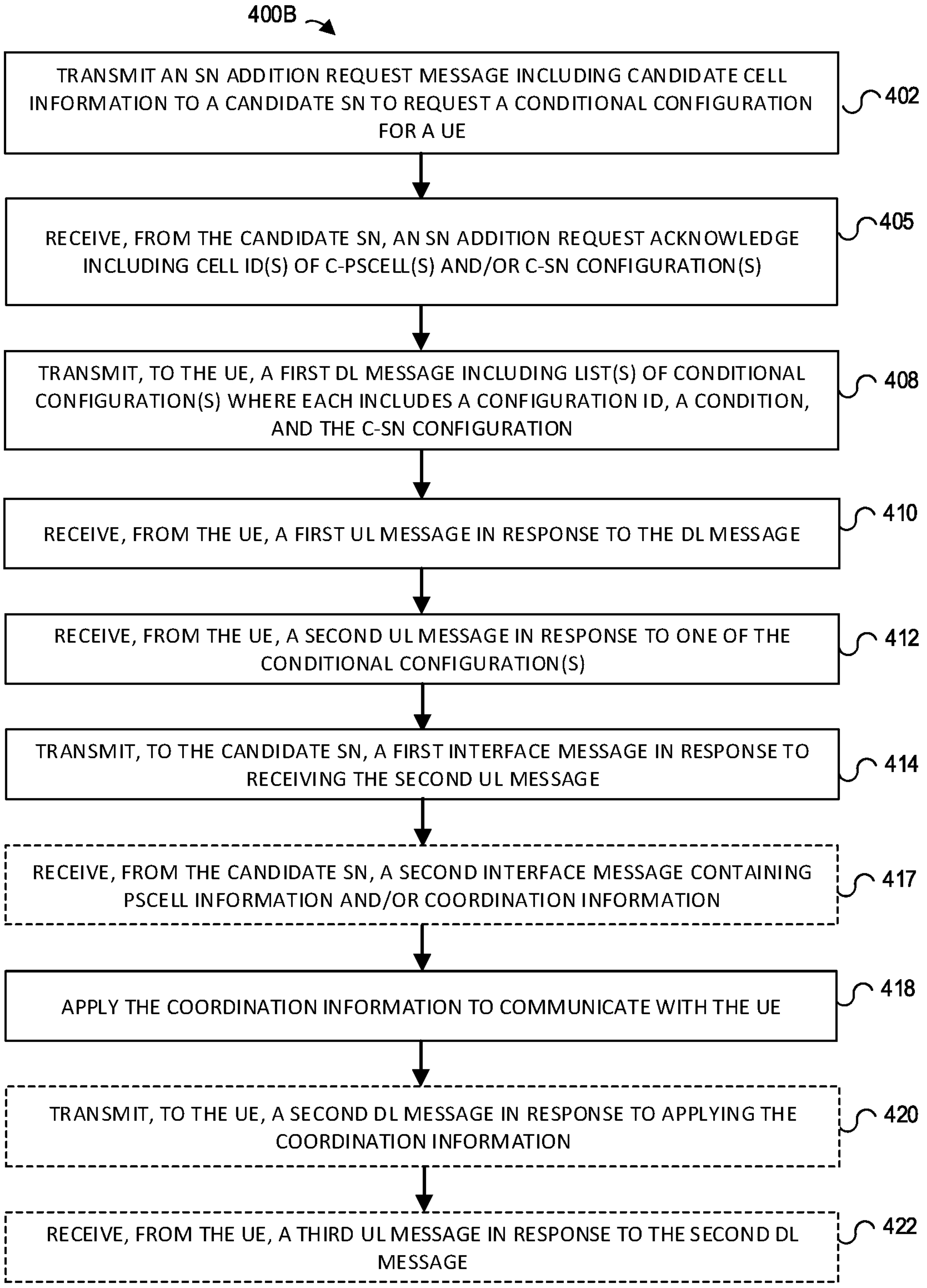
FIG. 4B is a flow diagram of an example method for receiving and applying multi-connectivity coordination information after determining to which secondary cell the UE is connected, where the method can be implemented in a base station of FIG. 1A operating as an MN.

Referring to FIGS. 4A-4B, an MN (e.g., the MN 104A), can apply coordination information in accordance with the methods 400A-400B, respectively. In particular, the method 400A corresponds to actions that the MN can perform during the scenario 300A, and the method 400B corresponds to actions that the MN can perform during the scenario 300B. Generally speaking, similar blocks in FIGS. 4A-4B are labeled with the same reference numbers (e.g., block 402 in FIG. 4A is equivalent to block 402 in FIG. 4B).

Turning first to FIG. 4A, during the method 400A, the MN at block 402 transmits an SN Addition Request message, including candidate cell information, to a C-SN (e.g., the C-SN 106A) to request a conditional configuration for a UE (e.g., the UE 102) (e.g., event 304). At block 404, the MN receives, from the C-SN, an SN Addition Request Acknowledge message including cell ID(s) of C-PSCell(s), C-SN configuration(s), and/or coordination information (e.g., event 308). At block 406, the MN refrains from applying the coordination information before the UE connects to the C-SN (e.g., event 310). The MN also transmits, at block 408, to the UE, a DL message including list(s) of conditional configuration(s), where each includes a configuration ID, a condition, and C-SN configuration (e.g., event 312). In response, the MN receives, at block 410, from the UE, a first UL message (e.g., event 314). Blocks 402-410 may be included in a conditional SN addition preparation procedure (e.g., procedure 380).

At block 412, the MN receives, from the UE, a second UL message in response to one of the conditional configuration(s) (e.g., event 322). The second UL message may identify the C-PSCell to which the UE has connected. At block 414, the MN transmits, to the C-SN, a first interface message in response to receiving the second UL message (e.g., event 324). Further, at block 416, the MN receives, from the C-SN, a second interface message containing PSCell information for the C-PSCell identified in the second UL message (e.g., event 326). At block 418, the MN applies the coordination information to communicate with the UE (e.g., event 328). At block 418, the MN also may apply MN restriction information, which the MN can refrain from applying at block 406. Blocks 412-418 may be included in a conditional SN addition execution procedure (e.g., procedure 390).

Turning to FIG. 4B, the method 400B is similar to the method 400A. However, different from block 404, at block 405, the MN receives, from the C-SN, an SN Addition Request Acknowledge message including cell ID(s) of C-PSCell(s) and/or C-SN configuration(s) and omitting coordination information (e.g., event 305). Thus, the method 400B does not include block 406 because the MN does not receive the coordination information before the UE connects to the C-SN. The flow then proceeds similarly to the method 400A. After block 414, at block 417, the MN receives, from the C-SN, a second interface message containing PSCell information and/or coordination information (e.g., event 327). The MN can then apply the coordination information to communicate with the UE, at block 418 (e.g., event 328 in FIG. 3B). In response to applying the coordination information, the MN may, at block 420, transmit a second DL message to the UE (e.g., event 330). At block 422, the MN may receive, in response to the second DL message, a third UL message (e.g., event 322).

Figure 5A:
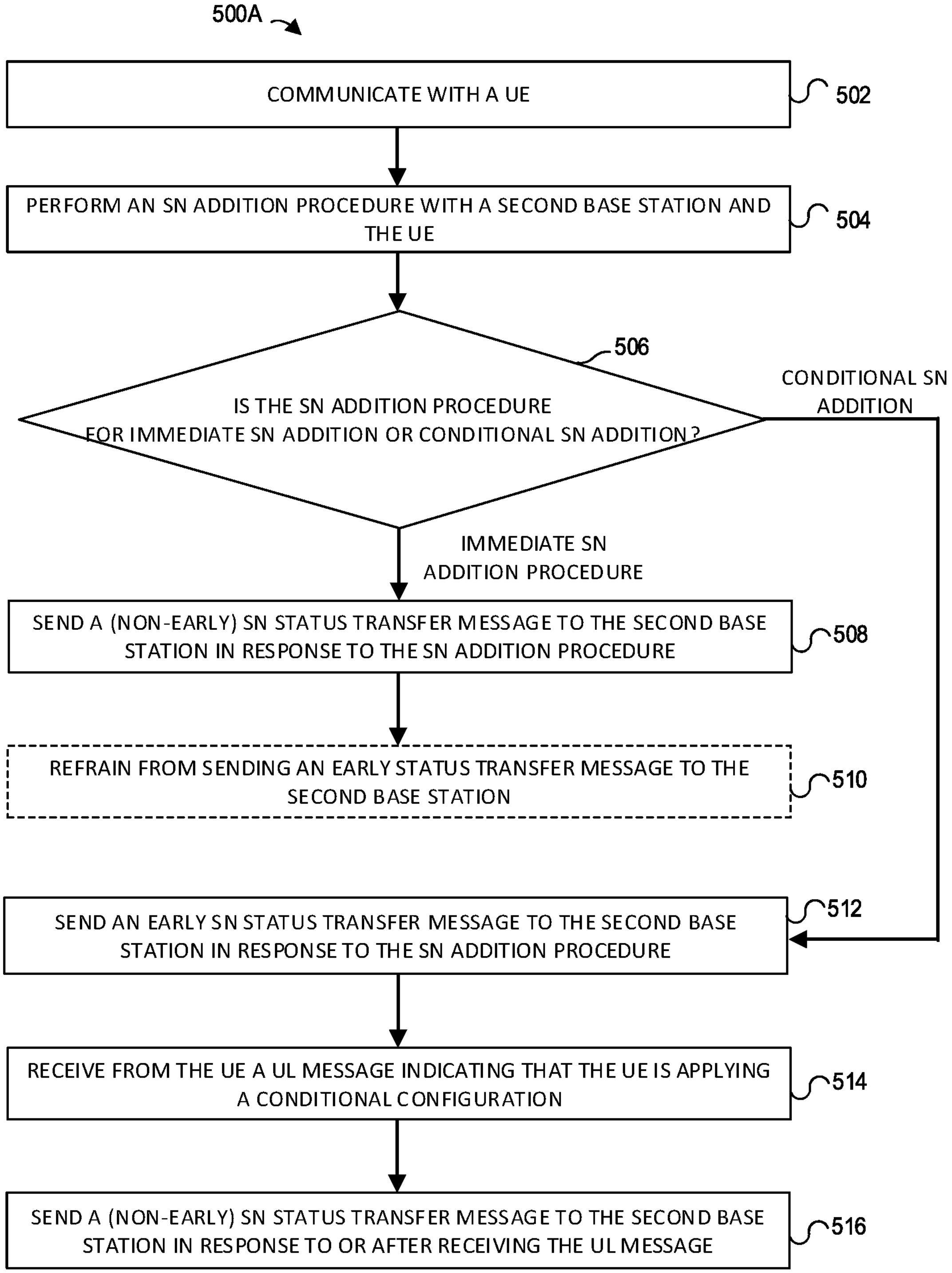
FIG. 5A is a flow diagram of an example method for determining whether to send an early or non-early sequence number (SN) status transfer message to another base station depending on whether the SN addition procedure is conditional or non-conditional, where the method can be implemented in a base station of FIG. 1A.
Figure 5B:
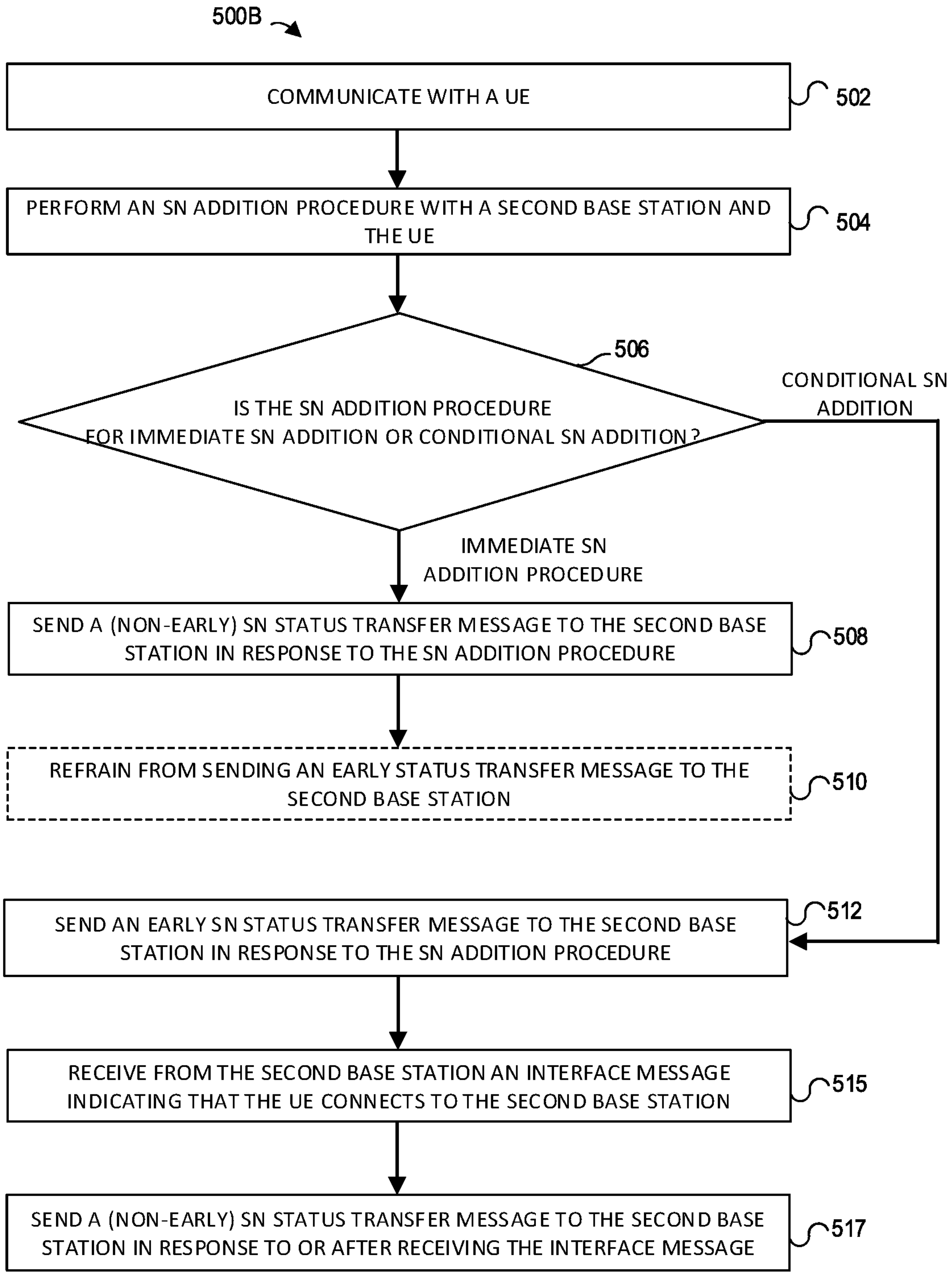
FIG. 5B is a flow diagram of a method similar to that of FIG. 5A, but with the base station receiving an indication that the UE connected to a secondary cell from the second base station rather than from the UE.

Referring to FIGS. 5A-5B, an MN (e.g., the MN 104A), can determine whether to send an early or non-early sequence number (SN) status transfer message to another base station using the methods 500A-500B, respectively. Generally speaking, similar blocks in FIGS. 5A-5B are labeled with the same reference numbers (e.g., block 502 in FIG. 5A is equivalent to block 502 in FIG. 5B).

Turning first to FIG. 5A, during the method 500A, the MN communicates with a UE (e.g., the UE 102) at block 502 (e.g., event 302). At block 504, the MN performs an SN addition procedure with a second base station and the UE (e.g., one of procedures 380, 381, 382, combined with 390, 391, 392, respectively). At block 506, the MN determines whether the SN addition procedure is for immediate SN addition or conditional SN addition. If the SN addition procedure is an immediate SN addition procedure, then the MN at block 508 sends a (non-early) sequence number (SN) Status Transfer message to the second base station in response to the SN addition procedure, and refrains from sending an early Status Transfer message to the second base station, at block 510.

If the SN addition procedure is a conditional SN procedure (and early data forwarding is necessary), then the MN sends at block 512 an early sequence number (SN) Status Transfer message to the second base station in response to the SN addition procedure (e.g., event 316). At block 514, the MN receives, from the UE, a UL message indicating that the UE is applying a conditional configuration (e.g., event 322, 332). At block 516, the MN sends a (non-early) Sequence Number Status Transfer message to the second base station in response to or after receiving the UL message (e.g., event 334).

Referring next to FIG. 5B, the method 500B is similar to the method 500A. However, from block 512, the flow proceeds to block 515, where the MN receives, from the second base station, an interface message indicating that the UE connects to the second base station (e.g., event 326, 327). At block 517, the MN sends a (non-early) Sequence Number Status Transfer message to the second base station in response to or after receiving the interface message (e.g., event 334).

Figure 6:
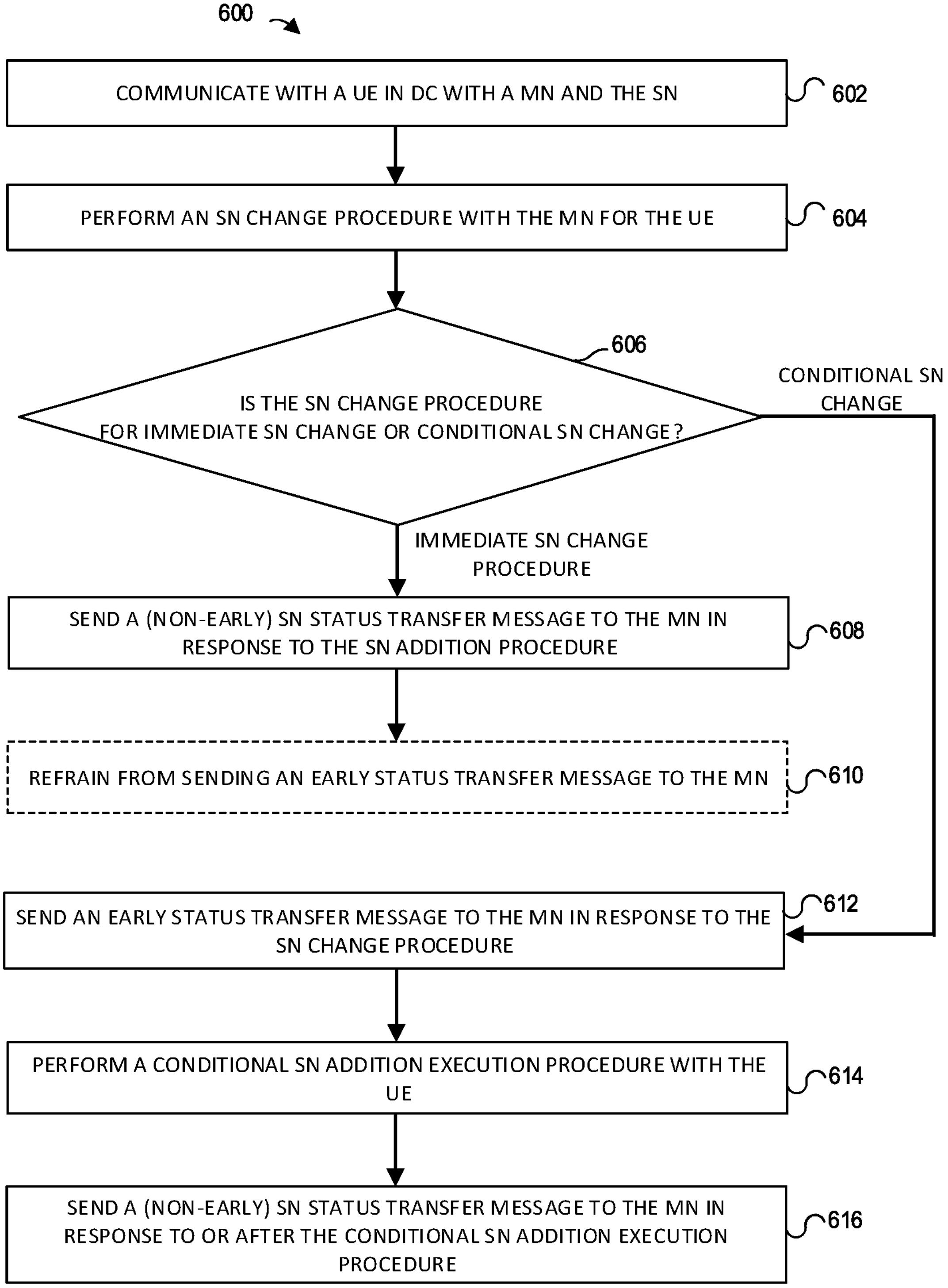
FIG. 6 is a flow diagram of an example method for determining whether to send an early or non-early sequence number (SN) status transfer message to the MN, depending on whether the SN change procedure is conditional or non-conditional, where the method can be implemented in a base station of FIG. 1A operating as a source SN (S-SN)

FIG. 6 is a flow diagram of a method 600 for determining whether to send an early or non-early sequence number (SN) Status Transfer message to an MN (e.g., the MN 104), depending on whether the SN change procedure is conditional or non-conditional, which can be implemented in a S-SN (e.g., the S-SN 106B). At block 602, the S-SN communicates with a UE in DC with an MN and the SN (e.g., event 301). At block 604, the S-SN performs an SN change procedure with the MN for the UE (e.g., event 380, 381, or 382 in FIGS. 3D-3E). At block 606, the S-SN determines whether the SN change procedure is for an immediate SN change or a conditional SN change. If the SN change procedure is for an immediate SN change, then at block 608, the S-SN sends a (non-early) sequence number (SN) Status Transfer message to the MN in response to the SN addition procedure, and refrains from sending an early Status Transfer message to the MN at block 610.

If the SN change procedure is for a conditional SN change (and early data forwarding is necessary), then at block 612, the S-SN sends an Early Status Transfer message to the MN in response to the SN change procedure (e.g., event 342). At block 614, the S-SN performs a conditional SN addition execution procedure with the UE (e.g., event 390, 391, or 392 in FIGS. 3D-3E). At block 616, the S-SN sends a (non-early) Sequence Number Status Transfer message to the MN in response to or after the conditional SN addition execution procedure (e.g., event 348).

In some implementations, the S-SN can receive an SN Release Request message from the MN during or after the conditional SN addition execution procedure (e.g., event 344). In other implementations, the S-SN can receive from the MN an interface message indicating CPC executed during or after the conditional SN addition execution procedure with the UE. In some implementations, the S-SN can send the (non-early) Sequence Number Status Transfer message to the MN at block 616 in response to receiving the SN Release Request message or the interface message indicating CPC triggered.

Figure 7:
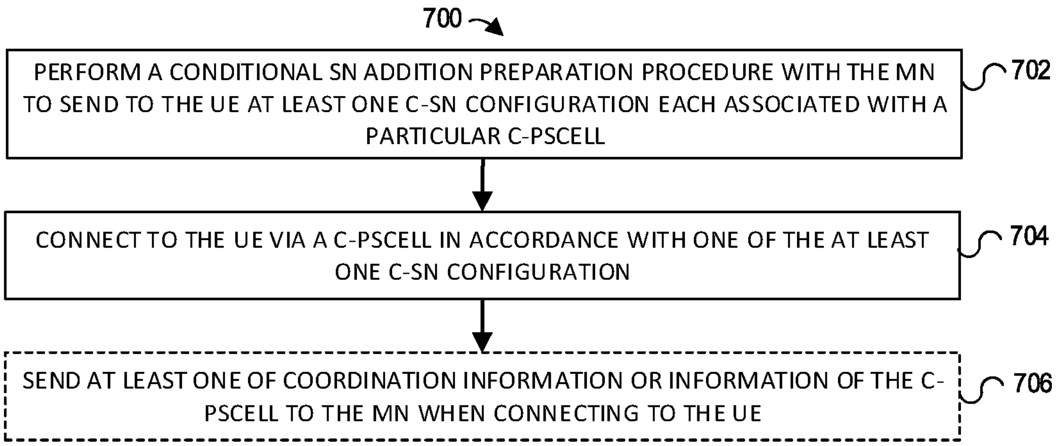
FIG. 7 is a flow diagram of an example method for providing multi-connectivity coordination information to the MN after the UE has connected to a candidate secondary cell, where the method can be implemented in a base station of FIG. 1A operating an a candidate SN (C-SN)
Figure 8:
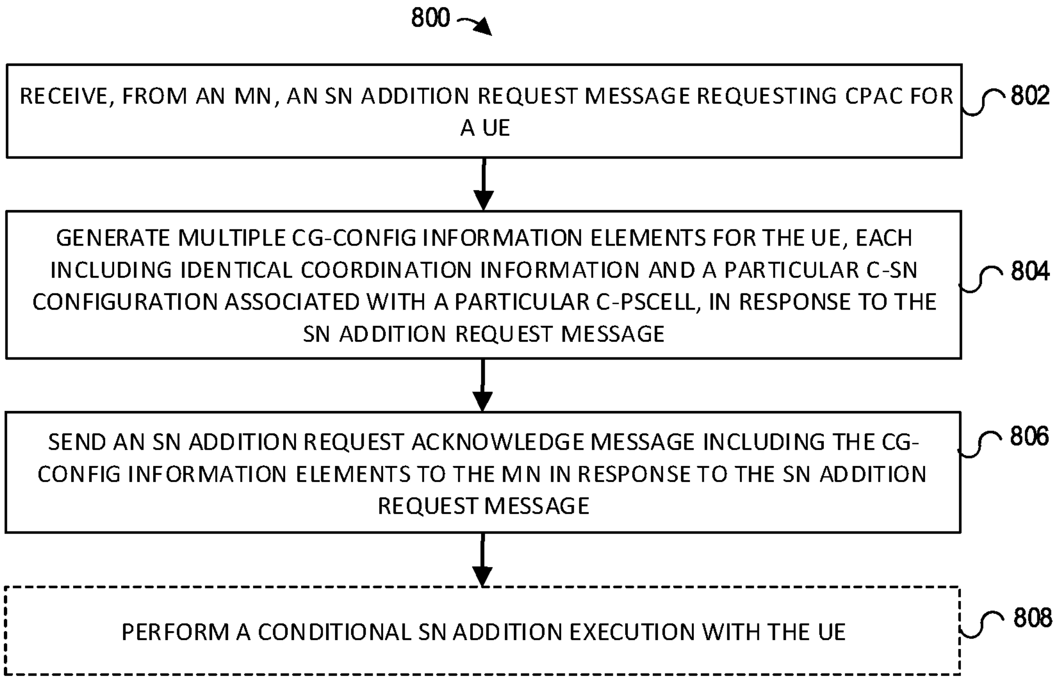
FIG. 8 is a flow diagram of an example method for providing identical multi-connectivity coordination information to the MN for all candidate cells, where the method can be implemented in a base station of FIG. 1A operating as a C-SN.

Referring to FIGS. 7-8, a C-SN (e.g., the C-SN 106A), can apply coordination information in accordance with the methods 400A-400B, respectively.

FIG. 7 illustrates a method 700 that a C-SN (e.g., the C-SN 106A) can implement for providing coordination information to an MN (e.g., the MN 104) after a UE (e.g., the UE 102) has connected to a C-PSCell. The method 700 corresponds to actions that the C-SN may perform during the scenario 300B. At block 702, the C-SN performs a conditional SN addition preparation procedure with the MN to send to the UE one or more C-SN configurations, each C-SN configuration associated with a particular C-PSCell (e.g., procedure 381). At block 704, the C-SN connects to the UE via a C-PSCell in accordance with one of the C-SN configuration(s) (e.g., event 320). At block 706, the C-SN sends at least one of coordination information or C-PSCell information for the C-PSCell, to the MN when connecting to the UE (e.g., event 327).

FIG. 8 illustrates a method 800 that a C-SN (e.g., the C-SN 106A) can implement for providing identical coordination information to a MN (e.g., the MN 104A) for all C-PSCells. The method 800 corresponds to actions that the C-SN may perform during the scenario 300C. At block 802, the C-SN receives, from an MN, an SN Addition Request message requesting CPAC for a UE (e.g., event 304). At block 804, the C-SN generates multiple CG-Config IEs for the UE, each CG-Config IE including identical coordination information and a particular C-SN configuration associated with a particular C-PSCell, in response to the SN Addition Request message (e.g., event 307 in FIG. 3C). At block 806, the C-SN sends an SN Addition Request Acknowledge message including the CG-Config IEs to the MN in response to the SN Addition Request message (e.g., event 308 in FIG. 3C). At block 808, the C-SN performs a conditional SN addition execution procedure with the UE (e.g., event 392).

Figure 9A:
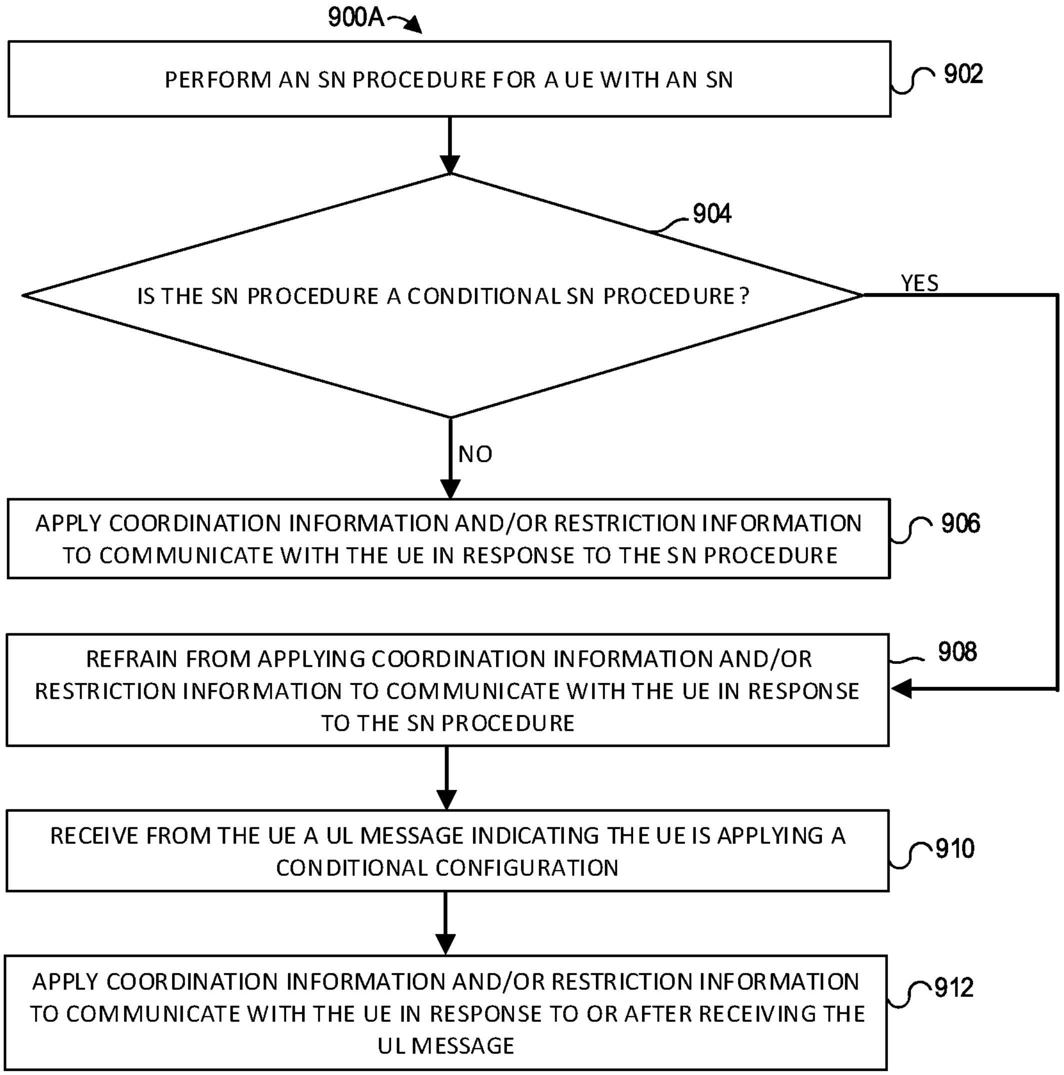
FIG. 9A is a flow diagram of an example method for determining when to apply multi-connectivity coordination information based on whether the SN procedure is conditional or immediate (non-conditional), where the method can be implemented in a base station of FIG. 1A operating as an MN.
Figure 9B:
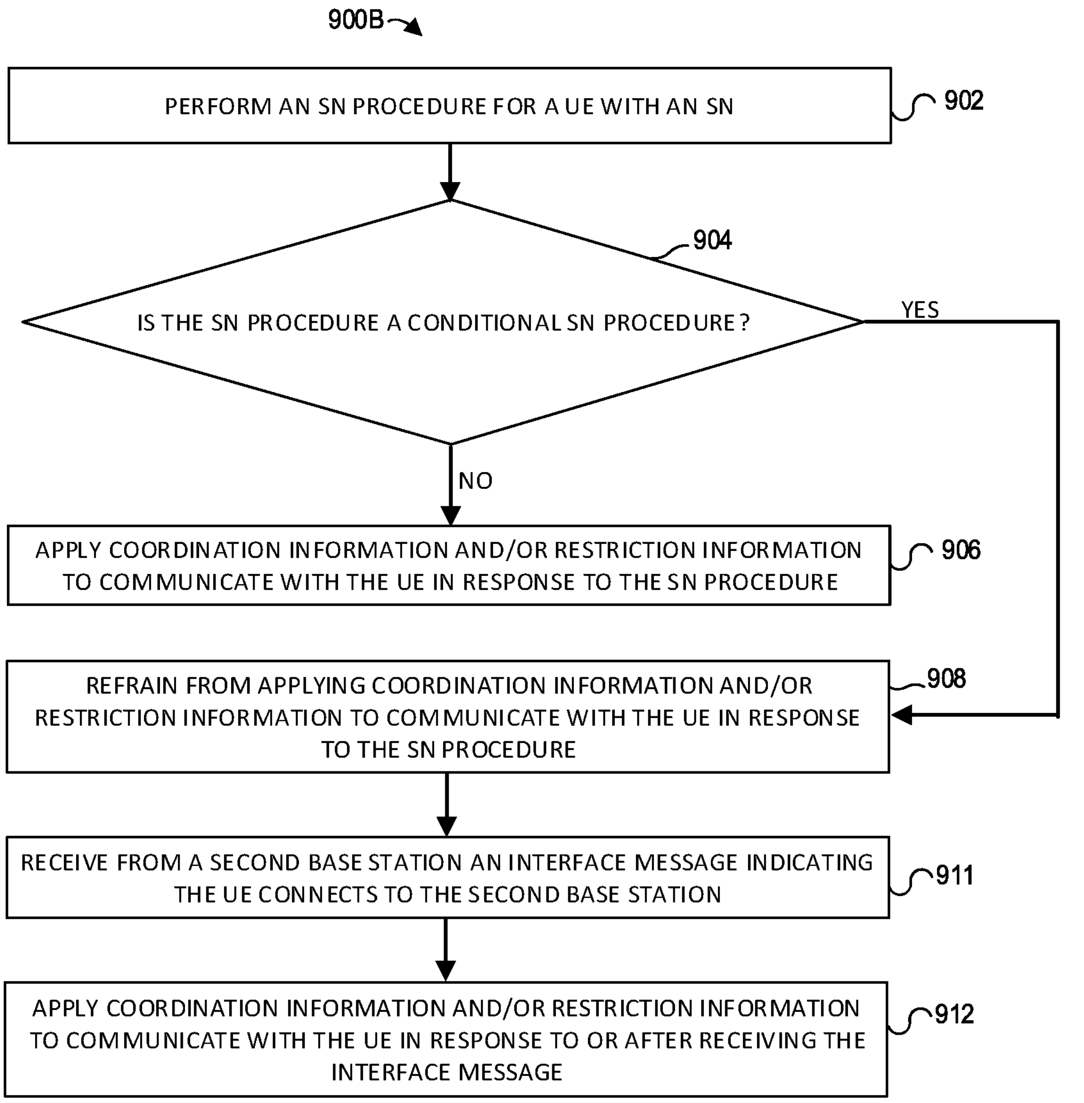
FIG. 9B is a flow diagram of an example method similar to that of FIG. 9A, but with the base station receiving an indication that the UE connected to a secondary cell from the second base station rather than from the UE.

FIGS. 9A-9B illustrate methods 900A-900B, respectively, performed by an MN (e.g., the MN 104A) for determining when to apply coordination information based on whether an SN procedure is conditional or immediate (non-conditional). Generally speaking, similar blocks in FIGS. 9A-9B are labeled with the same reference numbers (e.g., block 902 in FIG. 9A is equivalent to block 902 in FIG. 9B).

Referring first to FIG. 9A, during the method 900A, the MN performs an SN procedure for a UE (e.g., the UE 102) with an SN, at block 902. At block 904, the MN determines whether the SN procedure is a conditional SN procedure. If it is not, then at block 906, the MN applies coordination information and/or restriction information to communicate with the UE in response to the SN procedure. Otherwise (i.e., if the SN procedure is a conditional procedure), then at block 908, the MN refrains from applying coordination information and/or restriction information to communicate with the UE in response to the SN procedure (e.g., event 310). The MN, at block 910, receives from the UE a UL message indicating that the UE is applying a conditional configuration (e.g., event 322). At block 912, in response to or after receiving the UL message, the MN applies coordination information and/or restriction information to communicate with the UE in response to or after receiving the UL message (e.g., event 328).

FIG. 9B illustrates the method 900B, which is similar to the method 900A, except that the MN receives an indication that the UE is connected to a secondary cell from a second base station rather than from the UE. In particular, after block 908, at block 911, the MN receives, from a second base station (i.e., a C-SN), an interface message indicating that the UE connects to the second base station (e.g., event 326, 327). In response to or after receiving the interface message, the MN applies multi-connectivity information at block 912 (e.g., event 328).

Figure 10:
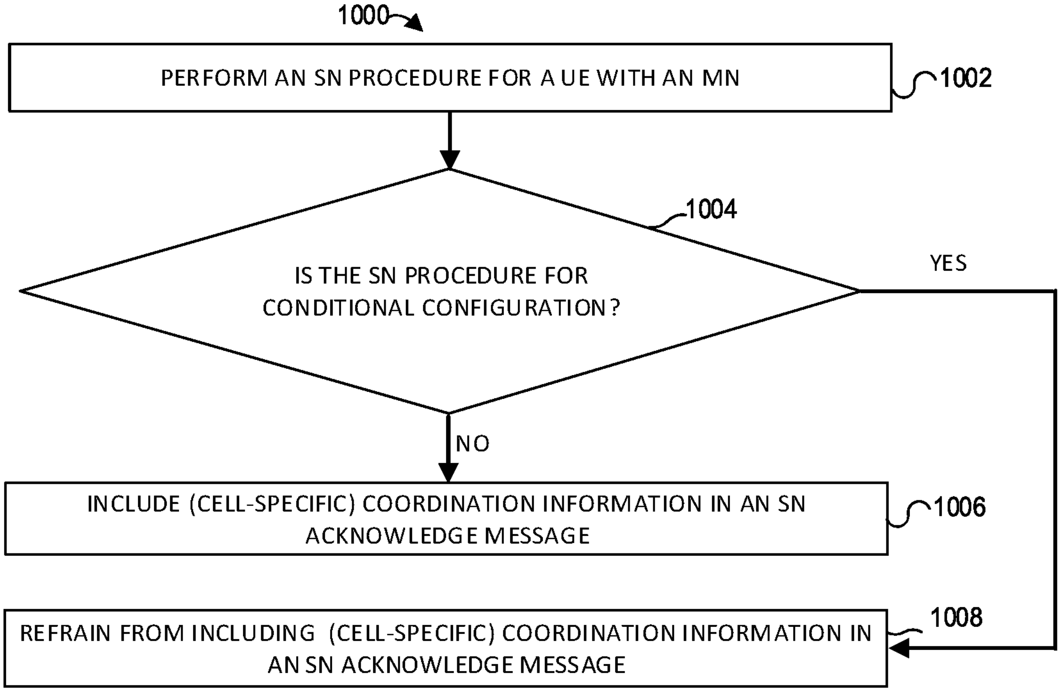
FIG. 10 is a flow diagram of an example method for determining whether to include multi-connectivity coordination information in an SN acknowledgement message depending on whether the SN procedure is immediate or conditional, where the method can be implemented in a base station of FIG. 1A operating as an SN.

FIG. 10 illustrates a method 1000 for determining whether to include coordination information in an SN acknowledgement message depending on whether an SN procedure is immediate or conditional, where the method 1000 can be implemented in an SN. The method 1000 corresponds to actions that an SN may perform during the scenario 300B, for example. At block 1002, the SN performs an SN procedure for a UE with an MN (e.g., events 380, 381, 382). During the SN procedure, the SN may receive an SN request message (e.g., an SN Addition Request message, such as at event 304). At block 1004, the SN determines whether the SN procedure is for conditional configuration. If it is not, then the SN includes (cell-specific) coordination information in an SN acknowledge message (e.g., an SN Addition Request Acknowledge message), at block 1006. Otherwise (i.e., the SN procedure is for conditional configuration), at block 1008, the SN refrains from including (cell-specific) coordination information in an SN acknowledge message (e.g., event 305).

Figure 11:
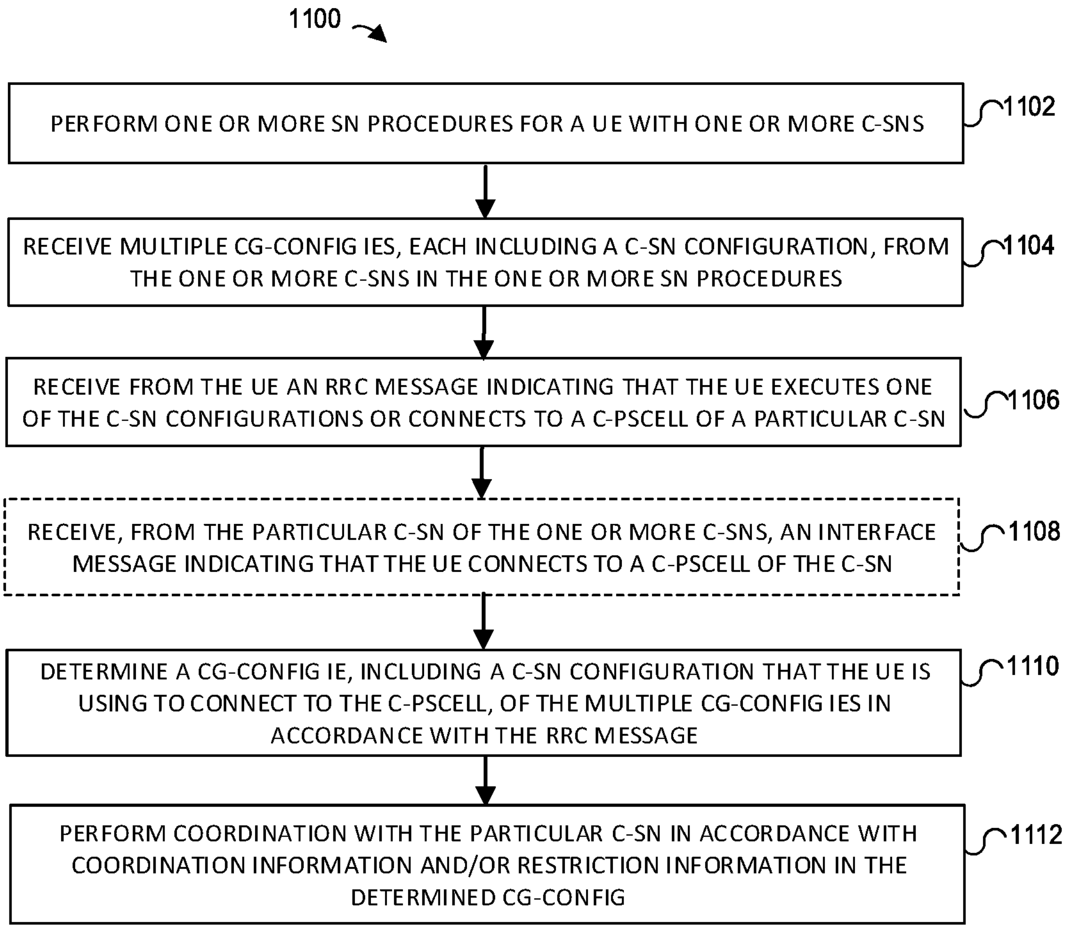
FIG. 11 is a flow diagram of an example method for processing multiple conditional SN configurations, where the method can be implemented in a base station operating as an MN.

FIG. 11 illustrates a method 1100 for processing multiple conditional SN configurations, where the method 1100 can be implemented in an MN (e.g., the MN 104A. At block 1102, the MN performs one or more SN procedures for a UE with one or more CNs. At block 1104, the MN receives multiple CG-Config IEs, each CG-Config IE including a C-SN configuration, from the one or more C-SNs in the one or more SN procedures (e.g., event 308). At block 1106, the MN receives, from the UE, an RRC message indicating that the UE executes one of the C-SN configurations or connects to a C-PSCell of a particular C-SN (e.g., event 322). At block 1108, the MN receives, from the particular C-SN of the one or more C-SNs, an interface message indicating that the UE connects to a C-PSCell of the C-SN (e.g., event 326). At block 1110, the MN determines a CG-Config IE, including a C-SN configuration that the UE is using to connect to the C-PSCell, of the multiple CG-Config IEs, in accordance with the RRC message. At block 1112, the MN performs coordination with the particular C-SN in accordance with coordination information and/or restriction information in the determined CG-Config.

Figure 12:
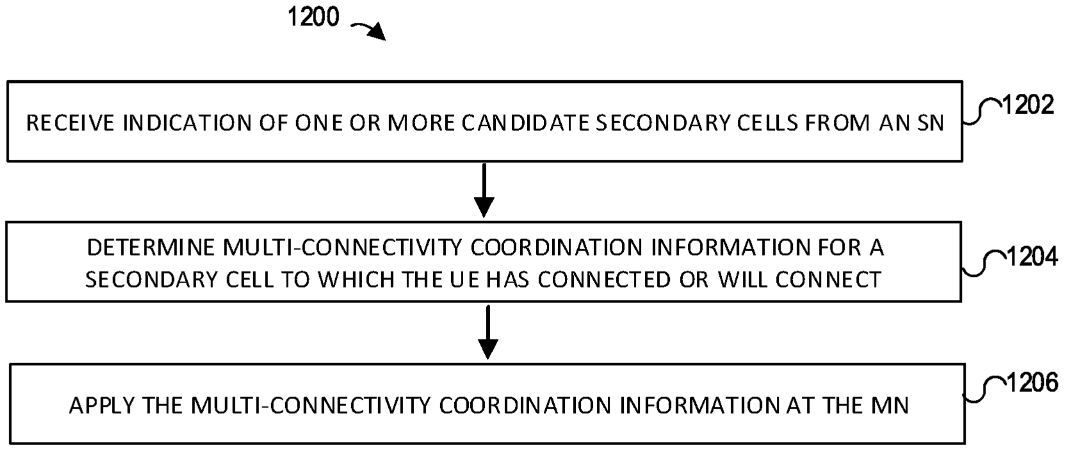
FIG. 12 is a flow diagram of an example method for supporting a conditional procedure, where the method can be implemented in base station operating as an MN.

FIG. 12 is a flow diagram of an example method 1200 for supporting a conditional procedure, where the method 1200 can be implemented in a first base station operating as an MN (e.g., the MN 104A). At block 1202, the MN receives, from a second base station, an indication of one or more candidate secondary cells (e.g., C-PSCells) to which the UE can connect, subject to a condition, to communicate in DC (e.g., event 308, 305). At block 1204, the MN determines multi-connectivity coordination information for a secondary cell to which the UE has connected or will connect (e.g., based on information received at events 308, 326, 327). The multi-connectivity coordination information may be for coordinating usage of radio resources between the MN and the second base station while providing the DC to the UE operating in the primary cell and the secondary cell selected from among the one or more candidate secondary cells. As mentioned previously with reference to FIG. 9A, multi-connectivity coordination information may include one or both of (i) coordination information and (ii) restriction information. At block 1206, the MN applies the multi-connectivity coordination information at the MN (e.g., event 311, 328).

The list of examples below reflects a variety of the embodiments explicitly contemplated.

Example 1 is a method in a first base station for supporting a conditional procedure for a user equipment (UE) operating in a primary cell of the first base station. The method includes: (1) receiving, by processing hardware from a second base station, an indication of one or more candidate secondary cells to which the UE can connect, subject to a condition, to communicate in dual connectivity (DC); (2) determining, by the processing hardware, multi-connectivity coordination information for a secondary cell, for coordinating usage of radio resources between the first base station and the second base station when providing the DC to the UE operating in the primary cell and the secondary cell selected from among the one or more candidate secondary cells; and (3) subsequently to the determining, applying, by the processing hardware, the multi-connectivity coordination information at the first base station.

Example 2 is the method of example 1, further including: receiving, subsequently to the UE connecting to the secondary cell, a message including cell information for the secondary cell; wherein the determining is based on the cell information.

Example 3 is the method of example 2, wherein the message is an interface message from the second base station.

Example 4 is the method of example 3, wherein the interface message includes coordination information for the secondary cell included in the multi-connectivity coordination information.

Example 5 is the method of example 3 or 4, wherein the interface message includes SN restriction information for the second base station.

Example 6 is the method of example 3, further including: receiving, from the second base station during a procedure for configuring the second base station as a candidate secondary node (C-SN), and prior to receiving the interface message, coordination information for a plurality of candidate secondary cells included in the multi-connectivity coordination information; and refraining, by the processing hardware, from applying any of the coordination information prior to receiving the interface message.

Example 7 is the method of example 6, wherein the interface message includes an identifier of the secondary cell.

Example 8 is the method of any of examples 3-7, further including, subsequently to receiving the interface message: transmitting, to the UE, configuration parameters to the UE, the configuration parameters based on applying the multi-connectivity coordination information at the first base station.

Example 9 is the method of example 2, wherein the message is an uplink (UL) message from the UE.

Example 10 is the method of example 1, further including: receiving, from the second base station during a procedure for configuring the second base station as a C-SN, coordination information for a plurality of candidate secondary cells included in the multi-connectivity coordination information; wherein the determining includes: detecting, by the processing hardware, that the coordination information is identical for each of the plurality of candidate secondary cells.

Example 11 is the method of any of the preceding examples, wherein the multi-connectivity coordination information includes one or more power coordination parameters.

Example 12 is the method of any of the preceding examples, wherein the multi-connectivity coordination information includes one or more discontinuous reception (DRX) parameters.

Example 13 is the method of any of the preceding examples, wherein the multi-connectivity coordination information includes master node (MN) restriction information related to a maximum uplink power the UE can use to communicate with the first base station.

Example 14 is the method of any of the preceding examples, wherein the multi-connectivity coordination information includes secondary node (SN) restriction information related to a maximum uplink power the UE can use to communicate with the second base station.

Example 15 is the method of any of the preceding examples, wherein: the conditional procedure to which the indication of the one or more candidate secondary cells pertains is conditional SN addition.

Example 16 is the method of any of examples 1-11, wherein: the conditional procedure to which the indication of the one or more candidate secondary cells pertains is conditional SN cell change.

Example 17 is the method of any of the preceding examples, further including: transmitting, by the processing hardware and subsequently to configuring the second base station as a C-SN, an early sequence number (SN) status transfer message to the second base station.

Example 18 is the method of example 17, further including: transmitting, by the processing hardware and subsequently to receiving the interface message, a non-early sequence number (SN) status transfer message to the second base station.

Example 19 is a method in a second base station for supporting a conditional procedure for a user equipment (UE) operating in a primary cell of a first base station. The method includes: (1) transmitting, by processing hardware to the first base station, an indication of one or more candidate secondary cells to which the UE can connect, subject to a condition, to communicate in dual connectivity (DC); (2) establishing, by the processing hardware, a connection between the UE and a secondary cell selected from among the one or more candidate secondary cells; and in response to the establishing, transmitting, by the processing hardware, coordination information for the secondary cell, for coordinating usage of radio resources between the first base station and the second base station when providing the DC to the UE.

Example 20 is the method of example 19, further including: refraining, by the processing hardware, from transmitting coordination information for all of the one or more candidate secondary cells prior to establishing the connection.

Example 21 is the method of example 19 or 20, wherein transmitting the indication occurs during a procedure for configuring the second base station as a candidate secondary node (C-SN).

Example 22 is the method of any of examples 19-21, wherein the coordination information includes at least one of a power coordination parameter or a DRX parameter.

Example 23 is the method of any of examples 19-22, wherein: the conditional procedure to which the indication of the one or more candidate secondary cells pertains is conditional SN addition.

Example 24 is the method of any of examples 19-22, wherein: the conditional procedure to which the indication of the one or more candidate secondary cells pertains is conditional SN cell change.

Example 25 is a method in a second base station for supporting a conditional procedure for a user equipment (UE) operating in a primary cell of a first base station. The method includes: (1) receiving, by processing hardware from the first base station, a request to add the second base station as a candidate secondary node (C-SN), to provide dual connectivity to the UE; (2) determining, by the processing hardware, a plurality of candidate secondary cells to which the UE can connect, subject to a condition; (3) generating, by the processing hardware, identical coordination information for each of the plurality of candidate secondary cells, for coordinating usage of radio resources between the first base station and the second base station when providing the DC to the UE; and (4) transmitting, by the processing hardware to the first base station and in a single message, (i) an indication of the plurality of candidate secondary cells and (ii) the coordination information.

Example 26 is a method of example 25, wherein the transmitting includes: transmitting an acknowledgement to the request.

Example 27 is a method of example 25 or 26, wherein the coordination information includes at least one of a power coordination parameter or a DRX parameter.

Example 28 is a method of any of examples 25-27, wherein: the conditional procedure to which the indication of the one or more candidate secondary cells pertains is conditional SN addition.

Example 29 is the method of any of examples 25-27, wherein: the conditional procedure to which the indication of the one or more candidate secondary cells pertains is conditional SN cell change.

Example 30 is a method in a first base station operating as a master node (MN) for supporting a conditional secondary node (SN) procedure. The method includes: (1) providing, by processing hardware and with a second base station operating as a source SN (S-SN), dual connectivity to a UE; (2) performing, by the processing hardware and with the second base station and a third base station, a preparation procedure for configuring the third base station as a candidate secondary node (C-SN), to modify the dual connectivity for the UE subject to a condition; (3) performing, by the processing hardware and subsequently to the condition being satisfied, an SN addition or change procedure in accordance with the preparation procedure; and (4) transmitting, by the processing hardware to the second base station, a command to release the second base station from the dual connectivity.

Example 31 is a method of example 30, further including: receiving, by the processing hardware from the second base station, an acknowledgement to the command.

Example 32 is a method of example 30, wherein the preparation procedure for configuring the third base station is MN-initiated.

Example 33 is a method in a first base station operating as a master node (MN) for supporting a secondary node (SN) procedure. The method includes: (1) performing, by processing hardware, a preparation procedure to configure a second base station as (i) an SN or (ii) a candidate SN, subject to a condition, to provide dual connectivity to a UE; and (2) subsequently to performing the procedure: in a first instance, in response to determining that the procedure is a non-conditional procedure in which the second base station operates as an SN, transmitting a non-early sequence number (SN) status transfer message to the second base station, and in a second instance, in response to determining that the procedure is a conditional procedure in which the second base station operates as a candidate SN, transmitting an early sequence number (SN) status transfer message to the second base station.

Example 34 is a method of example 33, wherein the early SN status transfer message conforms to an XnAP format.

Example 35 is a method of example 33 or 34, wherein the early SN status transfer message is a message dedicated to reporting or requesting early SN status transfer.

Example 36. A base station including processing hardware and configured to implement a method according to any one of the preceding examples.

The following description may be applied to the description above.

In some implementations, "message" is used and can be replaced by "information element (IE)". In some implementations, "IE" is used and can be replaced by "field". In some implementations, "configuration" can be replaced by "configurations" or the configuration parameters.

A user device in which the above-described methods can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may be software modules (e.g., code, or machine-readable instructions stored on non-transitory machine-readable medium) or hardware modules. A hardware module is a tangible unit capable of performing certain operations and may be configured or arranged in a certain manner. A hardware module can include dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the methods can be provided as part of the operating system, a library used by multiple applications, a particular software application, etc. The software can be executed by one or more general-purpose processors or one or more special-purpose processors.

What is claimed is:

1. A method in a first base station for supporting a conditional procedure for a user equipment (UE) operating in a primary cell of the first base station, the method comprising:

receiving, by the first base station from a second base station:

an indication of a plurality of candidate secondary cells to which the UE can connect, subject to a condition, to communicate in dual connectivity (DC);

a respective Cell Group (CG)-Config information element (IE) for each candidate secondary cell of the plurality of candidate secondary cells, the respective CG-Config IE including a respective CG-configuration for the each candidate secondary cell; and respective coordination information including respective one or more coordination parameters corresponding to the each candidate secondary cell and usable for coordinating usage of radio resources with the second base station while the UE communicates in DC; and applying, by the first base station, the respective one or more coordination parameters corresponding to a secondary cell included in the plurality of candidate secondary cells to coordinate the usage of radio resources with the second base station while the UE communicates in DC via the secondary cell.

2. The method of claim 1, wherein the respective CG-configuration for the secondary includes the respective one or more coordination parameters corresponding to the secondary cell.

3. The method of claim 1, wherein the plurality of CG-Config IEs and the respective coordination information are included in an acknowledgement transmitted by the second base station in response to a Secondary Node (SN) Addition Request transmitted by the first base station.

4. The method of claim 1, wherein the respective one or more coordination parameters corresponding to the secondary cell include at least one of a power coordination parameter or a discontinuous reception (DRX) parameter.

5. The method of claim 1, wherein:

the conditional procedure to which the indication of the plurality of candidate secondary cells pertains is conditional Secondary Node (SN) addition or conditional SN change.

6. The method of claim 1, wherein the first base station communicates with the UE using a first radio access technology (RAT), which is different from a second RAT used by the second base station to communicate with the UE.

7. A method in a second base station for supporting a conditional procedure for a user equipment (UE) operating in a primary cell of a first base station, the method comprising:

transmitting, by the second base station to the first base station:

an indication of a plurality of candidate secondary cells to which the UE can connect, subject to a condition, to communicate in dual connectivity (DC);

a respective Cell Group (CG)-Config information element (IE) for each candidate secondary cell of the plurality of candidate secondary cells, the respective CG-Config IE including a respective CG-configuration for the each candidate secondary cell; and respective coordination information including respective one or more coordination parameters corresponding to the each candidate secondary cell and usable for coordinating usage of radio resources with the first base station while the UE communicates in DC;

establishing, by the second base station, a connection between the UE and a secondary cell among the plurality of candidate secondary cells; and coordinating, by the second base station, the usage of radio resources between the first base station and the second base station while the UE communicates in DC via the secondary cell.

8. The method of claim 7, wherein the second base station delays the transmitting of the respective one or more coordination parameters for the each candidate secondary cell until the connection is established.

9. The method of claim 7, wherein the transmitting of the indication of the plurality of candidate secondary cells occurs during a procedure for configuring the second base station as a candidate secondary node (C-SN).

10. The method of claim 7, wherein the respective one or more coordination parameters corresponding to the secondary cell include at least one of a power coordination parameter or a DRX parameter.

11. The method of claim 7, wherein:

the conditional procedure to which the indication of the plurality of candidate secondary cells pertains is conditional Secondary Node (SN) addition.

12. The method of claim 7, wherein:

the conditional procedure to which the indication of the plurality of candidate secondary cells pertains is conditional Secondary Node (SN) cell change.

13. The method of claim 7, wherein the respective CG-configuration for the secondary cell includes the respective one or more coordination parameters corresponding to the secondary cell.

14. The method of claim 7, further comprising transmitting, to the first base station, an acknowledgement to a Secondary Node (SN) Addition Request received from the first base station, the plurality of CG-Config IEs and the respective coordination information included in the acknowledgement.

15. A first base station including processing hardware and a transceiver, and configured to support a conditional procedure for a user equipment (UE) operating in a primary cell of the first base station, including:

receive, from a second base station:

an indication of a plurality of candidate secondary cells to which the UE can connect, subject to a condition, to communicate in dual connectivity (DC);

a respective Cell Group (CG)-Config information element (IE) for each candidate secondary cell of the plurality of candidate secondary cells, the respective CG-Config 1E including a respective CG-configuration for the each candidate secondary cell; and respective coordination information including respective one or more coordination parameters corresponding to the each candidate secondary cell and usable for coordinating usage of radio resources with the second base station while the UE communicates in DC; and apply the respective one or more coordination parameters corresponding to a secondary cell included in the plurality of candidate secondary cells to coordinate the usage of radio resources with the second base station while the UE communicates in DC via the secondary cell.

16. The first base station of claim 15, wherein the respective CG-configuration for the secondary cell includes the respective one or more coordination parameters corresponding to the secondary cell.

17. The first base station of claim 15, further configured to:

responsively receive an acknowledgement to a Secondary Node (SN) Addition Request transmitted by the first base station, and wherein the plurality of CG-Config IEs and the respective coordination information are included in the acknowledgement.

18. The first base station of claim 15, wherein the respective one or more coordination parameters corresponding to the secondary cell include at least one of a power coordination parameter or a discontinuous reception (DRX) parameter.

19. The first base station of claim 15, wherein the conditional procedure to which the indication of the plurality of candidate secondary cells pertains is conditional Secondary Node (SN) addition or conditional SN change.

20. The first base station of claim 15, wherein the first base station communicates with the UE using a first radio access technology (RAT), which is different from a second RAT used by the second base station to communicate with the UE.

* * * * *